(12) United States Patent
Morita et al.

(10) Patent No.: US 8,890,386 B2
(45) Date of Patent: Nov. 18, 2014

(54) ROTOR AND MOTOR

(71) Applicant: ASMO Co., Ltd., Shizuoka-ken (JP)

(72) Inventors: Chie Morita, Kosai (JP); Yoji Yamada, Hamamatsu (JP); Seiya Yokoyama, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 240 days.

(21) Appl. No.: 13/662,722

(22) Filed: Oct. 29, 2012

(65) Prior Publication Data

US 2013/0106230 A1 May 2, 2013

(30) Foreign Application Priority Data

Oct. 31, 2011 (JP) .................................. 2011-239513
Nov. 10, 2011 (JP) .................................. 2011-246802
May 28, 2012 (JP) .................................. 2012-121183

(51) Int. Cl.
*H02K 21/12* (2006.01)
*H02K 1/27* (2006.01)

(52) U.S. Cl.
CPC ................ *H02K 1/27* (2013.01); *H02K 1/2713* (2013.01); *H02K 1/2733* (2013.01); *H02K 1/278* (2013.01)
USPC .......................... 310/156.66; 310/263; 310/44

(58) Field of Classification Search
USPC ............ 310/43–44, 156.66–156.73, 263, 269
See application file for complete search history.

(56) References Cited

U.S. PATENT DOCUMENTS

| | | | |
|---|---|---|---|
| 7,569,968 B2 * | 8/2009 | Nakamura | 310/263 |
| 7,737,602 B2 * | 6/2010 | Harada | 310/263 |
| 7,750,529 B2 * | 7/2010 | Tajima et al. | 310/257 |
| 8,624,459 B2 * | 1/2014 | Tokizawa | 310/156.66 |
| 2003/0102758 A1 * | 6/2003 | Kusase et al. | 310/156.66 |
| 2010/0226803 A1 * | 9/2010 | Tajima et al. | 417/423.7 |
| 2013/0069471 A1 * | 3/2013 | Kadiri et al. | 310/156.66 |
| 2013/0147288 A1 * | 6/2013 | Jack et al. | 310/44 |
| 2013/0270928 A1 * | 10/2013 | Nord | 310/12.26 |

FOREIGN PATENT DOCUMENTS

| | | |
|---|---|---|
| JP | 5-43749 U | 6/1993 |
| JP | 2012-115085 A | 6/2012 |

* cited by examiner

*Primary Examiner* — Thanh Lam
(74) *Attorney, Agent, or Firm* — Kilpatrick Townsend & Stockton LLP

(57) ABSTRACT

A rotor includes first and second rotor cores and a field magnet placed between the first and second rotor cores. Each of the rotor cores has a main body portion and a plurality of extensions, which extend radially outward from the main body portion at equal intervals in the circumferential direction. The field magnet causes the individual extensions to function as magnetic poles. A magnetic pole constituting section including at least part of each of the extensions and the first main body portion of each rotor core are made of different materials, made of the same material but formed as separate elements, or includes regions having different properties.

29 Claims, 23 Drawing Sheets

US 8,890,386 B2

ROTOR AND MOTOR

BACKGROUND OF THE INVENTION

The present invention relates to a rotor and a motor.

Rotors used in motors include a Lundell structure rotor, which uses a permanent magnetic field system as described in Japanese Laid-Open Utility Model Publication No. 5-43749, for example. Such a rotor includes a plurality of rotor cores having a plurality of claw poles (portions extending in radial directions) arranged in the circumferential direction and a permanent magnet located in the rotor cores. Magnetic flux produced by the permanent magnet causes the individual claw poles to function as alternately opposite magnetic poles.

The rotors of the aforementioned type has a problem that eddy currents occurring in extensions like the claw poles and leakage flux occurring in the extensions could cause a reduction in the motor output.

SUMMARY OF THE INVENTION

Accordingly, it is an objective of the present invention to provide a rotor and a motor that suppress eddy currents and leakage flux, which may occur in magnetic poles, thereby contributing to an increase in motor output.

To achieve the foregoing objective and in accordance with one aspect of the present invention, a rotor having a circumferential direction, radial directions, and an axial direction is provided. The rotor includes a first core, a second rotor core, a field magnet, and a field magnet. The first rotor core includes a first main body portion and a plurality of first extensions, which extend radially outward from the first main body portion at equal intervals in the circumferential direction. The second rotor core includes a second main body portion and a plurality of second extensions, which extend radially outward from the second main body portion at equal intervals in the circumferential direction. The field magnet is placed between the first rotor core and the second rotor core in the axial direction and is magnetized in the axial direction to cause the first extensions to function as first magnetic poles and the second extensions to function as second magnetic poles. A magnetic pole constituting section including at least part of each of the first extensions and the first main body portion are manufactured with different materials, manufactured with the same material but formed as separate elements, or include regions having different properties. A magnetic pole constituting section including at least part of each of the second extensions and the second main body portion are manufactured with different materials, manufactured with the same material but formed as separate elements, or include regions having different properties.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

A first embodiment of the present invention will now be described with reference to the drawings.

Figure 1:
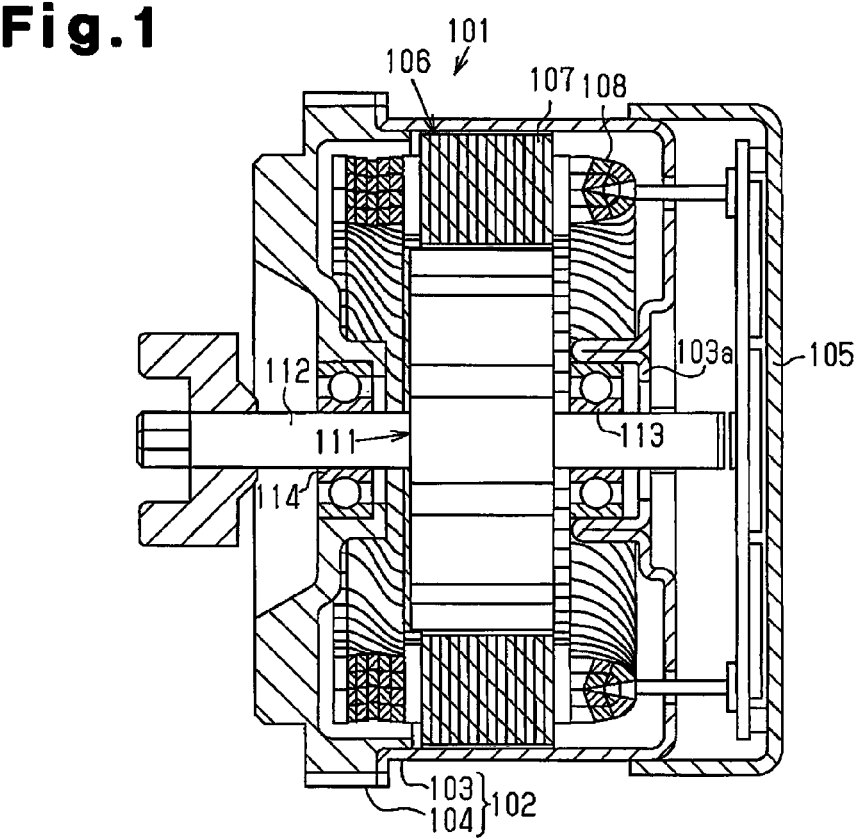
FIG. 1 is a cross-sectional view of a motor according to a first embodiment of the present invention.

As depicted in FIG. 1, a motor case 102 of a motor 101 includes a cylindrical housing 103 having a bottom 103a on a rear side (right side as illustrated in FIG. 1) and an opening on a front side (left side as illustrated in FIG. 1) as well as a front-end plate 104, which closes the opening of the housing 103. A circuitry accommodating box 105, which accommodates a power supply circuit made of a circuit board, for example, is affixed to a rear end of the housing 103. A stator 106 is affixed to an inner circumferential surface of the housing 103. The stator 106 includes an armature core 107 having a plurality of teeth extending inward in radial directions, and segment conductor (SC) coils 108 wound around the individual teeth of the armature core 107. The motor 101 further includes a rotor 111 located inside the stator 106. The rotor 111 has a rotary shaft 112. The rotary shaft 112 is a nonmagnetic metal shaft rotationally supported by bearings 113 and 114 held on the bottom 103a of the housing 103 and the front-end plate 104 thereof, respectively.

Figure 2:
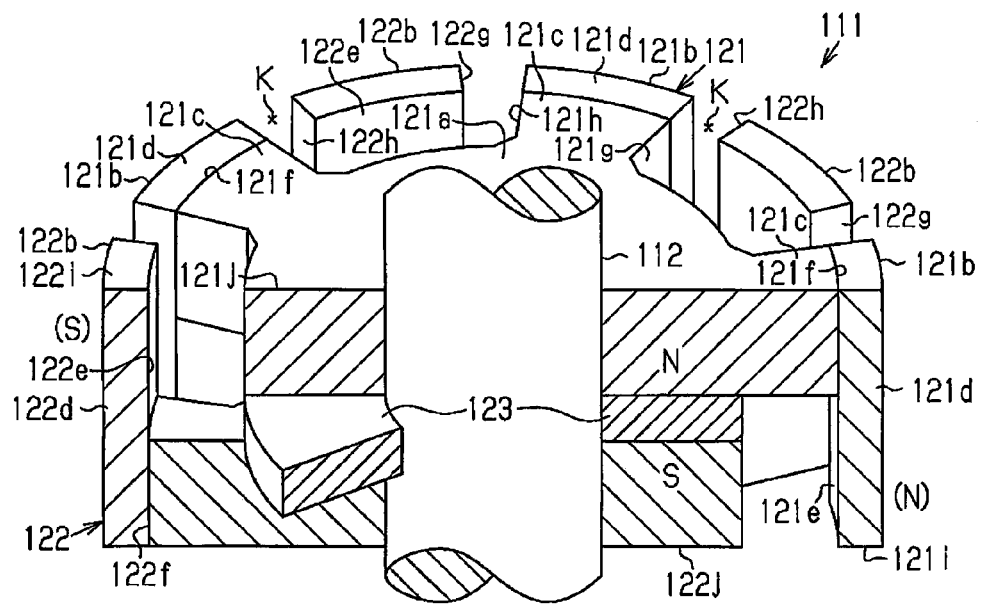
FIG. 2 is a partially cutaway perspective view of a rotor illustrated in FIG. 1.
Figure 3:
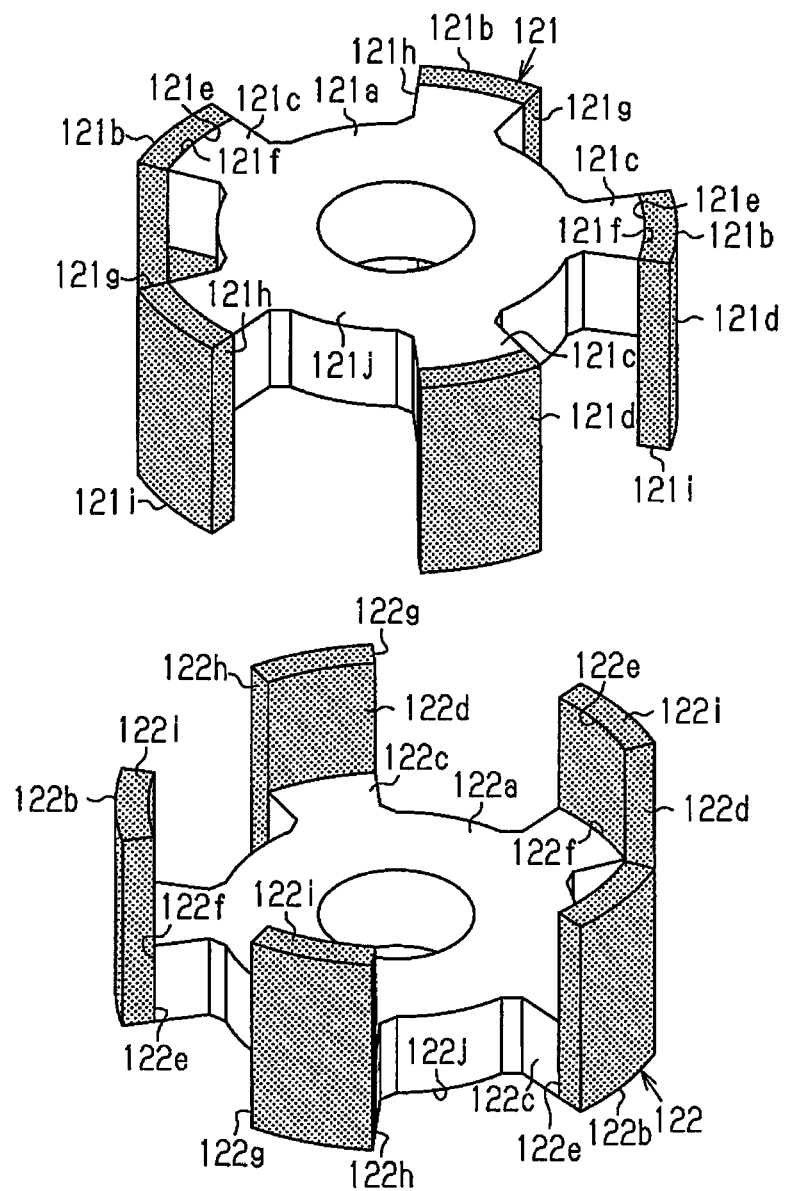
FIG. 3 is an exploded perspective view of rotor cores illustrated in FIG. 2.

As depicted in FIGS. 2 and 3, the rotor 111 includes first and second rotor cores 121, 122 and an annular magnet 123, which serves as a field magnet. The first rotor core 121 includes a substantially circular disk-like first core base 121a and a plurality (five in this embodiment) of first claw poles 121b arranged at equal intervals around an outer peripheral part of the first core base 121a. Each of the first claw poles 121b has a protruding portion 121c and a claw portion 121d. The protruding portion 121c and the claw portion 121d are formed as separate elements and joined together. The individual protruding portions 121c are formed to extend radially outward from the first core base 121a, forming a single structure therewith. Each of the protruding portions 121c has a sectorial cross section that is perpendicular to an axial direction. The first core base 121a has the same thickness as the protruding portions 121c as measured in the axial direction. The individual claw portions 121d are formed into a substantially rectangular shape having a substantially sectorial cross section that is perpendicular to the axial direction. A back surface 121e (a radially inside surface) of each claw portion 121d is affixed to an outer peripheral surface 121f of the corresponding protruding portion 121c by adhesive bonding, for example. The claw portion 121d extends in the axial direction from the protruding portion 121c. Since the first core base 121a and the protruding portions 121c together forming a main body portion of the first rotor core 121 and the claw portions 121d of the first claw poles 121b are formed as separate elements and joined together, boundary regions are formed between radially inner and outer parts, i.e., between the back surface 121e of each claw portion 121d and the outer peripheral surface 121f of the corresponding protruding portion 121c.

The first core base 121a, which is structured with the protruding portions 121c, and the claw portions 121d are made of different materials. For example, the first core base 121a and the protruding portions 121c are made of iron-based sintered metal, while the claw portions 121d are made of a powder magnetic core material (refer to FIG. 3). The claw portions 121d are formed by mixing magnetic powder like iron powder and an insulating material like plastic and subjecting the obtained mixture to hot press work by use of a metal die, for example.

Circumferential end surfaces 121g, 121h of each of the first claw poles 121b constitute flat surfaces, which extend radially outward and are not inclined with respect to the respective radial directions as viewed in the axial direction. The angle of each first claw pole 121b in the circumferential direction, or a central angle subtended by an arc formed between the two circumferential end surfaces 121g, 121h of each first claw pole 121b, is made smaller than the angle between one first claw pole 121b and the next arranged in the circumferential direction.

The second rotor core 122 is made of the same material and formed into the same shape as the first rotor core 121. The second rotor core 122 includes a substantially circular disk-like second core base 122a and protruding portions 122c of a plurality (five in this embodiment) of second claw poles 122b arranged at equal intervals around an outer peripheral part of the second core base 122a. A back surface 122e of each of claw portions 122d is affixed to an outer peripheral surface 122f of the corresponding protruding portion 122c by adhesive bonding, for example. Circumferential end surfaces 122g, 122h of each of the second claw poles 122b, or the protruding portion 122c and the claw portion 122d, constitute flat surfaces extending radially outward. The angle of each second claw pole 122b in the circumferential direction, or a central angle subtended by an arc formed between the two circumferential end surfaces 122g, 122h of each second claw pole 122b, is made smaller than the angle between one second claw pole 122b and the next arranged in the circumferential direction.

The second rotor core 122 is assembled with the first rotor core 121 such that each of the claw portions 122d of the second claw poles 122b is located between corresponding two of the claw portions 121d of the first claw poles 121b in the circumferential direction and the annular magnet 123 is placed (sandwiched) between the first core base 121a and the second core base 122a in the axial direction. The claw portions 121d, 122d each have such an axial length that axial end surfaces 121i, 122i of the claw portions 121d, 122d become flush with axially outside end surfaces 121j, 122j of the first and second rotor cores 121, 122, respectively.

There are provided a plurality of axially extending gaps K (refer to FIG. 2) between first and second claw poles 121b, 122b that are adjacent to each other in the circumferential direction. The individual gaps K are interconnected through spaces provided between the back surface 121e of each claw portion 121d, and the second core base 122a and the annular magnet 123. Further, the individual gaps K are interconnected through spaces provided between the back surface 122e of each claw portion 122d, and the first core base 121a and the annular magnet 123.

The annular magnet 123 is configured to have the same outside diameter as the first and second core bases 121a, 122a. The annular magnet 123 is magnetized in the axial direction such that the first claw poles 121b function as first magnetic poles (north poles in this embodiment) and the second claw poles 122b function as second magnetic poles (south poles in this embodiment). Thus, the rotor 111 of this embodiment is a so-called Lundell-type rotor which employs the annular magnet 123 as the field magnet. For example, it is possible to employ a neodymium magnet as the annular magnet 123.

Operation of the motor 101 thus configured will now be described.

When a drive current is fed into the segment conductor (SC) coils 108 through the power supply circuit provided in the circuitry accommodating box 105 in the above-described motor 101, a magnetic field for rotating the rotor 111 is generated in the stator 106 so that the rotor 111 is driven to rotate. Magnetic flux produced when the rotor 111 is driven to rotate induces eddy currents that flow within the first and second rotor cores 121, 122 of the rotor 111. In the individual claw poles 121b, 122b of this embodiment, there exist the boundary regions between the claw portions 121d, 122d and the protruding portions 121c, 122c, which are formed as separate elements, and these boundary regions serve to suppress the occurrence of eddy currents in the claw poles 121b, 122b. This makes it possible to increase the output of the motor 101. Also, since the claw portions 121d, 122d are made of the powder magnetic core material, it is possible to easily adjust the amount of suppression of the eddy currents by regulating the ratio of the magnetic powder and the insulating material that are mixed.

Characteristic advantages of the first embodiment will now described.

(1) In the above-described rotor 111, the claw portions 121d, 122d of the first and second claw poles 121b, 122b are formed as elements separate from the first and second core bases 121a, 122a and the protruding portions 121c, 122c (main body portions) and are joined together. Thus, there exist the boundary regions in between. Since the occurrence of eddy currents in the claw poles 121b, 122b is suppressed by the boundary regions as a consequence, it is possible to increase the output of the motor 101.

(2) The claw portions 121d, 122d, which includes outer surface portions of the claw poles 121b, 122b, are formed as elements separate from the first and second core bases 121a, 122a and the protruding portions 121c, 122c (main body portions). It is therefore possible to reliably suppress the occurrence of eddy currents in the outer surface portions of the claw poles 121b, 122b from which the magnetic flux is produced toward the stator 106, making it possible to further increase the output of the motor 101.

(3) Since the claw portions 121d, 122d are made of the powder magnetic core material, which is prepared by mixing dissimilar materials including magnetic powder and insulating material, it is possible to easily adjust the degree of suppression of the eddy currents by regulating the ratio of the magnetic powder and insulating material that are mixed.

The first embodiment may be modified as described below.

The aforementioned structure and constituent materials of the rotor 111 of the first embodiment are merely an example of the present invention and may be modified as appropriate. For example, the rotor 111 may be modified as depicted in FIGS. 4A to 4C, which represent first rotor cores 131, 132, 133 only and not second rotor cores having the same shape therewith, respectively.

Figure 4A:
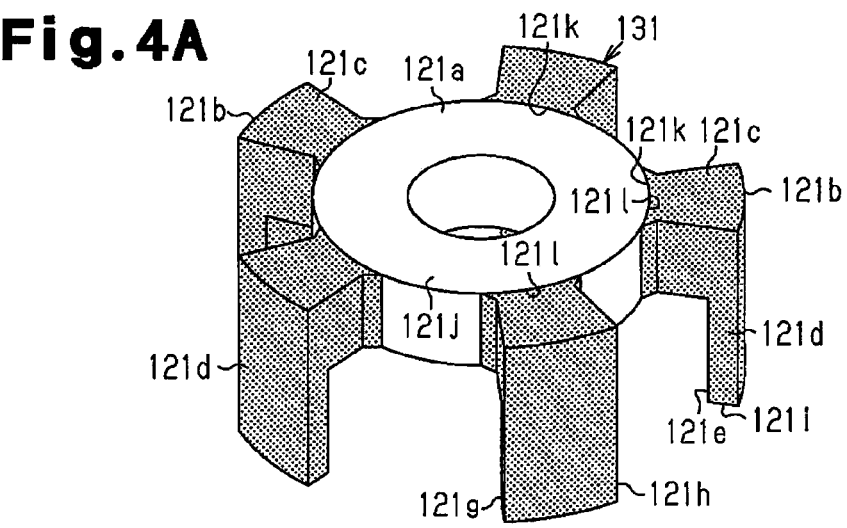
FIGS. 4A to 4C are perspective views of rotor cores in modifications of the first embodiment.

In the first rotor core 131 depicted in FIG. 4A, the entirety of each first claw pole 121b including the protruding portion 121c is formed from powder magnetic core material and is prepared as an element separate from the first core base 121a. In this case, the first core base 121a functions as a main body portion of the first rotor core 131. Inside surfaces 121k of the first claw poles 121b of the first rotor core 131 are affixed to an outer peripheral surface 121l of the first core base 121a by adhesive bonding, for example. This means that boundary regions are formed between the first core base 121a and the individual first claw poles 121b. These boundary regions make it possible to suppress the occurrence of eddy currents in a reliable fashion as in the above-described first embodiment.

Figure 4B:
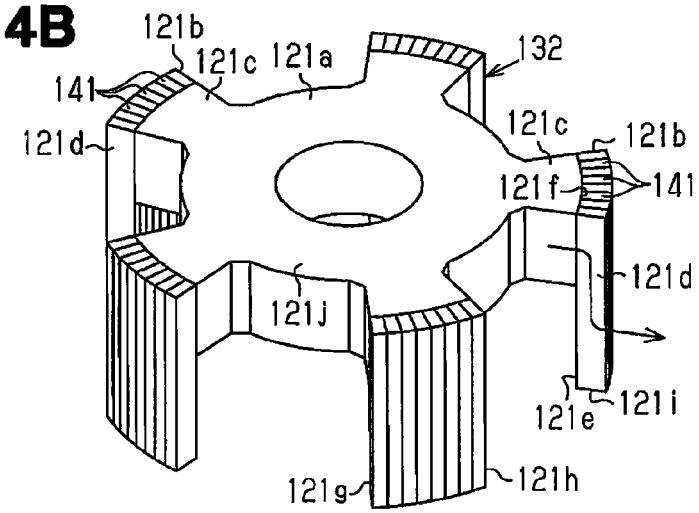
Figure 4C:
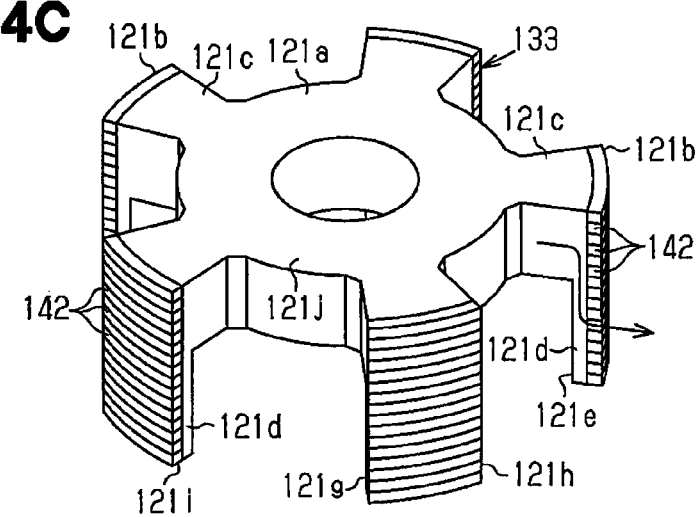

In the first rotor cores 132, 133 depicted in FIGS. 4B and 4C, a portion of each first claw pole 121b formed as a separate element is made of a plurality of laminated steel plates 141, 142, such as magnetic steel plates, respectively. In the first rotor core 132 depicted in FIG. 4B, the entirety of each claw portion 121d is formed by laminating the steel plates 141. In this case, the steel plates 141 are laminated in the circumferential direction. The claw portions 121d are affixed to the outer peripheral surfaces 121f of the individual protruding portions 121c by adhesive bonding, for example. In this structure, joint areas (adhesive bonds) serve as boundary regions and, therefore, it is possible to suppress the occurrence of eddy currents as in the above-described first embodiment. Since the entirety of each claw portion 121d is formed by laminating the steel plates 141 in the circumferential direction, there are created additional boundary regions between the individual steel plates 141. This structure exerts an effect to rectify magnetic flux in the circumferential direction, making it possible to suppress the occurrence of eddy currents in a reliable fashion. Furthermore, since magnetic flux oriented in the axial direction is not suppressed, lines of magnetic flux emerging from the annular magnet 123 can extend up to extreme ends of the claw poles 121b.

In the first rotor core 133 depicted in FIG. 4C, a radially outer half of each claw portion 121d is formed by laminating the steel plates 142. In this case, the steel plates 142 are laminated in the axial direction. The radially outer half of each claw portion 121d is affixed to the remaining inner half of the claw portion 121d by adhesive bonding, for example. In this case, joint areas (adhesive bonds) serve as boundary regions and, therefore, it is possible to suppress the occurrence of eddy currents as in the above-described first embodiment. Since the outer half of each claw portion 121d is formed by laminating the steel plates 142 in the axial direction, there are created additional boundary regions between the individual steel plates 142 in this case as well. This structure exerts an effect to rectify magnetic flux in the axial direction, making it possible to suppress the occurrence of eddy currents in a reliable fashion.

Although the claw portions 121d, 122d formed as separate elements are affixed to the protruding portions 121c, 122c by adhesive bonding in the first embodiment, the present invention is not limited thereto. For example, a simple fitting structure may be used to facilitate fixation as depicted in FIGS. 5A to 5C, which represent first rotor cores 134, 135, 136 only and not second rotor cores having the same shape, respectively.

Figure 5A:
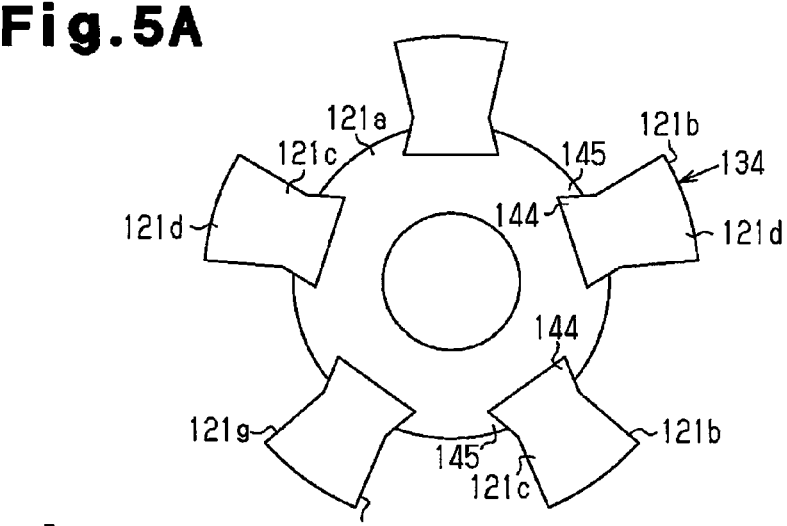
FIGS. 5A to 5C are plan views of rotor cores in other modifications of the first embodiment.

In the first rotor core 134 depicted in FIG. 5A, the entirety of each first claw pole 121b is prepared as an element separate from the first core base 121a and fitted into the first core base 121a with the aid of dovetail-structured fitting portions 144, 145. Fitting areas thus produced serve as boundary regions in this structure as well and, therefore, it is possible to suppress the occurrence of eddy currents in a preferable fashion.

Figure 5B:
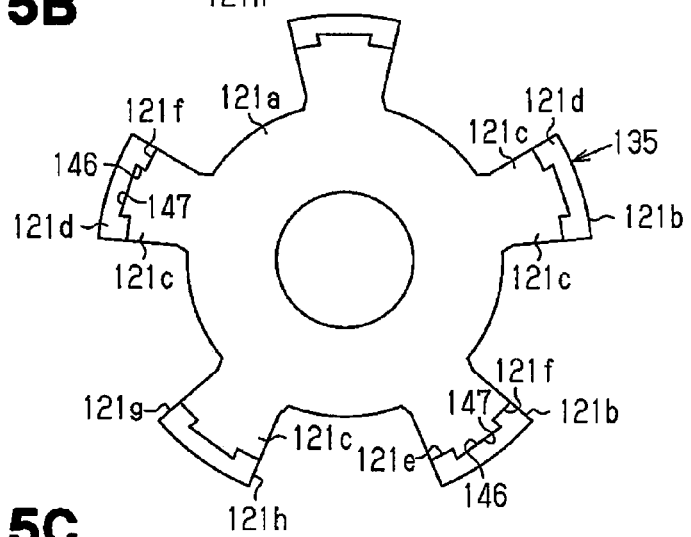

In the first rotor core 135 depicted in FIG. 5B, the claw portion 121d of each first claw pole 121b is prepared as an element separate from a main body portion of the rotor core 135 including the protruding portions 121c and fitted to the main body portion with the aid of dovetail-structured fitting portions 146, 147. Fitting areas thus produced serve as boundary regions in this structure as well and, therefore, it is possible to suppress the occurrence of eddy currents in a reliable fashion. Furthermore, since side surfaces of each dovetailed tenon chiefly become compressed, thereby increasing reluctance, this dovetail structure is expected to produce an effect to rectify magnetic flux at the joint areas of the claw portions 121d.

Figure 5C:
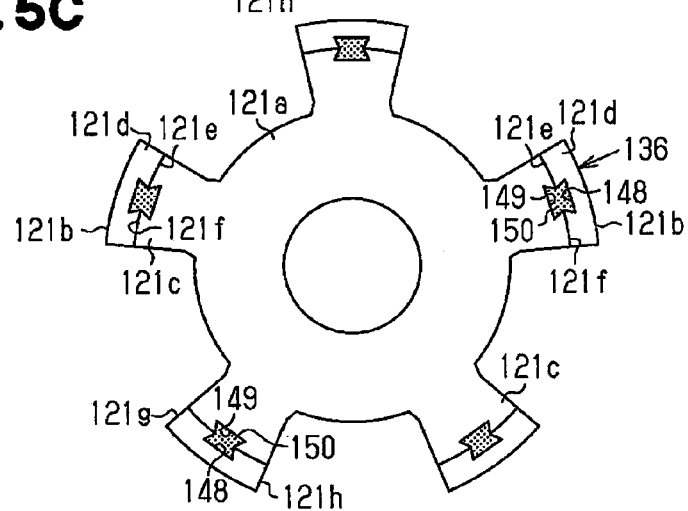

In the first rotor core 136 depicted in FIG. 5C, the claw portion 121d of each first claw pole 121b is prepared as an element separate from a main body portion of the rotor core 136 including the protruding portions 121c and fitted to the main body portion with the aid of fitting grooves 148, 149 and a joint member 150 placed therebetween. A dovetail structure is used for fitting rotor core elements in this case as well. Individual joint members 150 are made of a material having higher reluctance than surrounding members, such as resin, stainless steel (SUS) or brass. Fitting areas thus produced serve as boundary regions in this structure as well and, therefore, it is possible to suppress the occurrence of eddy currents in a reliable fashion. Additionally, since the joint members 150 themselves provide reluctance, the joint members 150 are expected to produce an effect to rectify magnetic flux at the joint areas of the claw portions 121d.

Magnetic pole constituting sections, such as the claw portions 121d, 122d or the entirety of the claw poles 121b, 122b, may be affixed to the main body portions of the rotor cores 121, 122, respectively, not only by bonding or fitting but also by other methods. For example, the magnetic pole constituting sections may be formed integrally with the main body portions of the rotor core 121 or 122. Boundary regions are also formed in this modified structure, making it possible to suppress the occurrence of eddy currents. The magnetic pole constituting sections may be so formed as to have a different property through heating by laser irradiation, melting, surface treatment, or the like. Since the boundary regions are formed in this case as well, it is possible to suppress the occurrence of eddy currents.

The first embodiment may be reconfigured to include auxiliary magnets located on the back surfaces 121e, 122e of the claw portions 121d, 122d of the individual claw poles 121b, 122b and/or in the gaps K between the individual claw poles 121b, 122b in the circumferential direction to achieve a reduction in leakage flux.

(Second Embodiment)

A second embodiment of the present invention will now be described hereunder with reference to FIGS. 6 to 10.

Figure 6:
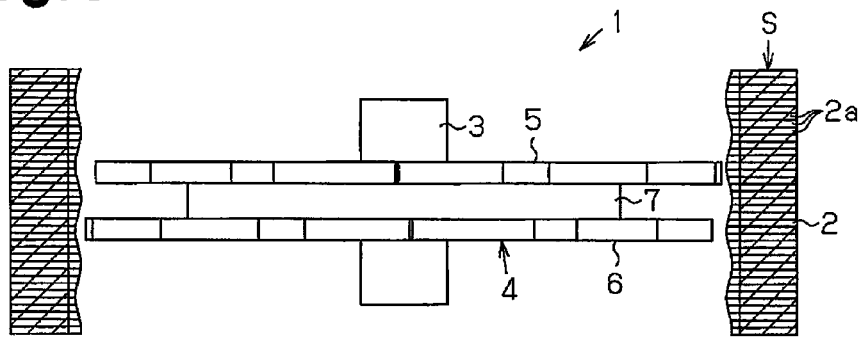
FIG. 6 is a front view of a rotor provided in a brushless motor according to a second embodiment of the present invention.

As depicted in FIG. 6, a stator S of a brushless motor 1 is fixed inside an unillustrated motor case. A stator core 2 of the stator S is formed by laminating a plurality of stator core pieces 2a made of steel plates.

A rotary shaft 3 is located inside the stator S to pass through a rotor 4, which is firmly fixed to the rotary shaft 3, as illustrated in FIG. 6. In this embodiment, the rotary shaft 3 is a nonmagnetic metal shaft that is rotationally supported by unillustrated bearings provided in the motor case. The rotor 4 has a structure including a pair of core sheets and a magnet sandwiched between the core sheets.

Figure 7:
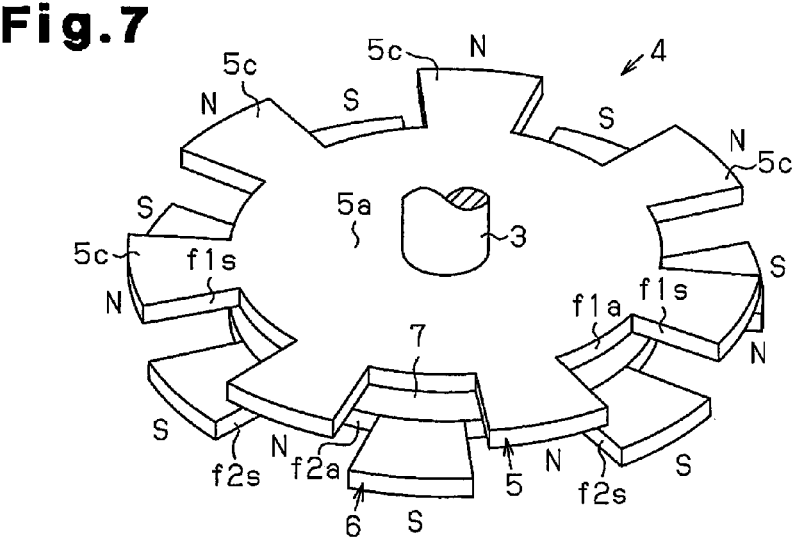
FIG. 7 is a perspective view of the rotor illustrated in FIG. 6.
Figure 8:
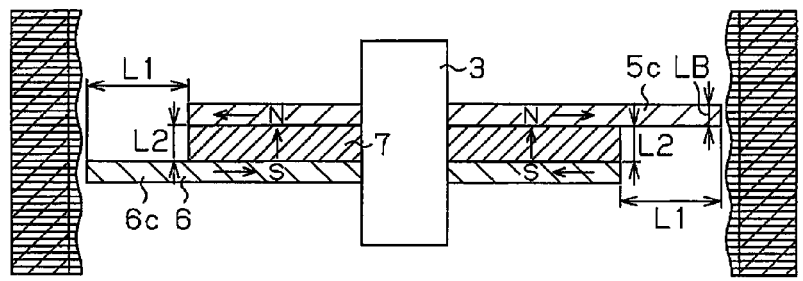
FIG. 8 is a cross-sectional view of the rotor illustrated in FIG. 6.

More specifically, the rotor 4 includes, as depicted in FIGS. 7 and 8, a first core sheet 5, which serves as a first rotor core, a second core sheet 6, which serves as a second rotor core placed to face the first core sheet 5 in the axial direction, and a first magnet sheet 7, which serves as a field magnet placed between the first core sheet 5 and the second core sheet 6.

<First Core Sheet 5>

Figure 10:
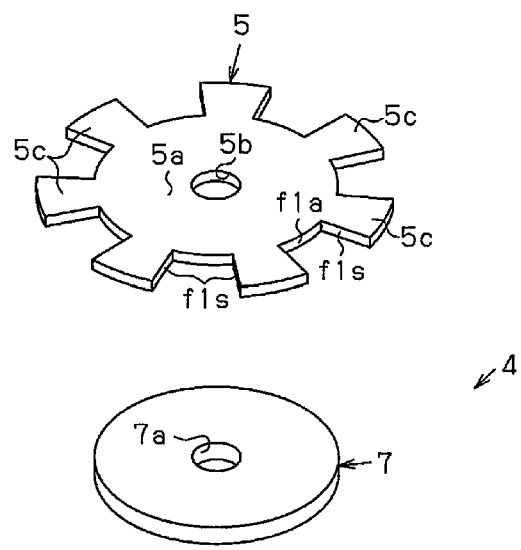
FIG. 10 is an exploded perspective view of the rotor illustrated in FIG. 6.

The first core sheet 5 is formed of an electromagnetic steel plate, which is a plate member made of a soft magnetic material, and has a first disk portion 5a as depicted in FIGS. 7 and 10. A through hole 5b, in which the rotary shaft 3 is fitted, is formed in a central part of the first disk portion 5a.

The first disk portion 5a is provided with seven first supporting tabs 5c extending radially outward at equal circumferential intervals from an outer peripheral surface f1a of the first disk portion 5a. Side surfaces f1s on both circumferential sides of each of the first supporting tabs 5c are so formed as to coincide with radial lines drawn radially outward from a central axis of the rotary shaft 3 as viewed in the axial direction.

Each of the first supporting tabs 5c is formed to have a width smaller than the distance from one first supporting tab 5c to the next as measured in the circumferential direction. With this arrangement, the first supporting tabs 5c are arranged at equal intervals around the first core sheet 5.

<Second Core Sheet 6>

The second core sheet 6 is an electromagnetic steel plate, which is a plate member made of the same soft magnetic material in the same shape as the first core sheet 5, having a second disk portion 6a as depicted in FIGS. 7 and 10. A through hole 6b, in which the rotary shaft 3 is fitted, is formed in a central part of the second disk portion 6a. The second disk portion 6a is provided with seven second supporting tabs 6c extending radially outward at equal circumferential intervals from an outer peripheral surface f2a of the second disk portion 6a. Side surfaces f2s on both circumferential sides of each of the second supporting tabs 6c are so formed as to coincide with radial lines drawn radially outward from the central axis of the rotary shaft 3 as viewed in the axial direction.

Each of the second supporting tabs 6c is formed to have a width smaller than the distance from one second supporting tab 6c to the next as measured in the circumferential direction. With this arrangement, the second supporting tabs 6c are arranged at equal intervals in the circumferential direction of the second core sheet 6.

The second core sheet 6 is arranged with respect to the first core sheet 5 and fixed onto the rotary shaft 3 such that the second supporting tabs 6c of the second core sheet 6 are not positioned face to face with the first supporting tabs 5c of the first core sheet 5. That is, each of the second supporting tabs 6c is positioned between two adjacent first supporting tabs 5c as viewed in the axial direction.

The first and second core sheets 5, 6 are both formed by punching electromagnetic steel plates made of a soft magnetic material. The first core sheet 5 is arranged with respect to the second core sheet 6 and fixed onto the rotary shaft 3 such that the first supporting tabs 5c are not positioned face to face with the second supporting tabs 6c in the axial direction. The first and second supporting tabs 5c, 6c are formed such that the circumferential side surfaces f1s, f2s of any first and second supporting tabs 5c, 6c located adjacent to each other as viewed in the axial direction are separated from each other in the circumferential direction all the way from a proximal end to an distal end of each of the supporting tabs 5c, 6c as illustrated in FIG. 9.

Figure 9:
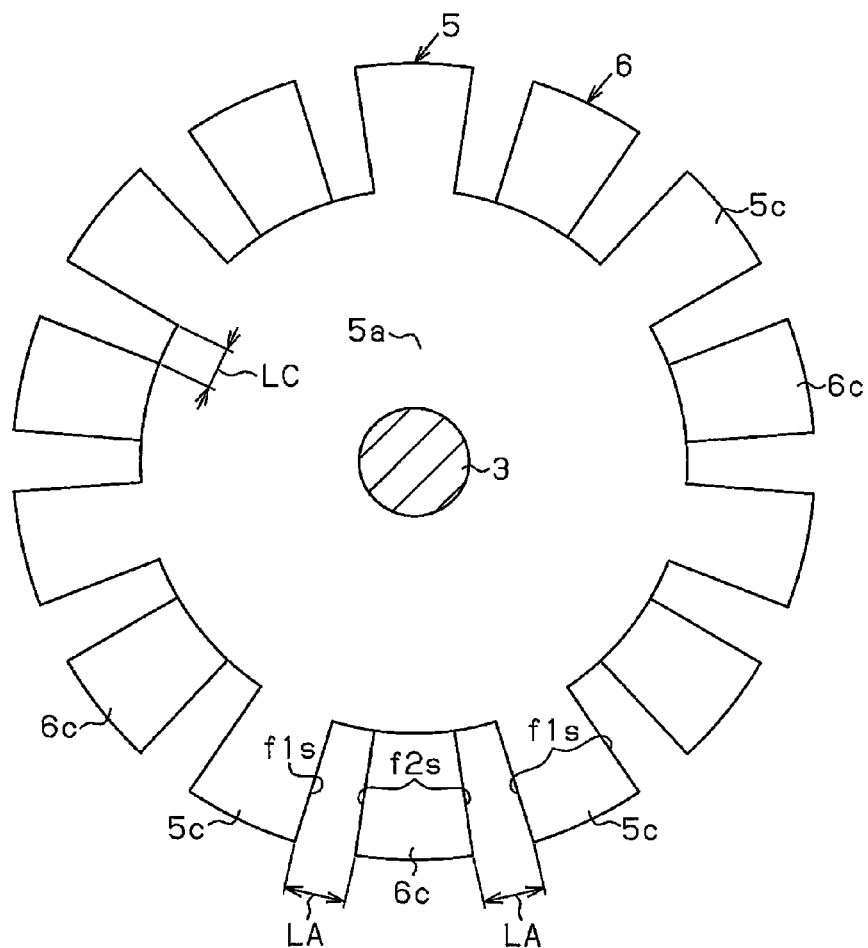
FIG. 9 is a front view of the rotor illustrated in FIG. 6 as seen from the side of a first core sheet.

Specifically, the distance LA between the distal ends of the first and second supporting tabs 5c, 6c located circumferentially adjacent to each other is made equal to or larger than the length (thickness LB shown in FIG. 8) of the first core sheet 5 (or the second core sheet 6) measured in the axial direction as depicted in FIG. 9. Although in the present embodiment, the distance LC between the proximal ends of the first and second supporting tabs 5c, 6c located circumferentially adjacent to each other equals the thickness LB as depicted in FIG. 9, the distance LC between the proximal ends may be made larger than the thickness LB.

If the first and second supporting tabs 5c, 6c are formed such that the circumferential side surfaces f1s, f2s of any first and second supporting tabs 5c, 6c located adjacent to each other as viewed in the axial direction are separated from each other in the circumferential direction by the same distance all the way from the proximal end to the distal end of each of the supporting tabs 5c, 6c, it is preferable that this distance be equal to or larger than the thickness LB.

When the first and second core sheets 5, 6 are arranged and fixed onto the rotary shaft 3, the first and second core sheets 5, 6 sandwich the first magnet sheet 7 in between. The first magnet sheet 7 of this embodiment is a circular disk made of a bonded magnet or a rubber magnet and has a through hole 7a formed in a central part as depicted in FIG. 10. The rotary shaft 3 is fitted in this through hole 7a. The circular disk-shaped first magnet sheet 7 has an outside diameter equal to that of the first and second disk portions 5a, 6a of the first and second core sheets 5, 6.

To be more specific, the outside diameter of the first magnet sheet 7 is smaller than the outside diameter of an imaginary cylinder formed by the first and second supporting tabs 5c, 6c, that is, the outside diameter of the first and second core sheets 5, 6 including portions where the first and second supporting tabs 5c, 6c are formed. As depicted in FIG. 8, the distance L1 measured radially from an outer peripheral surface of the first magnet sheet 7 to the distal end of each of the first and second supporting tabs 5c, 6c is larger than the thickness L2 of the first magnet sheet 7 measured in the axial direction.

The first magnet sheet 7 is magnetized in the axial direction such that a portion of the first magnet sheet 7 close to the first core sheet 5 constitutes a north pole and a portion of the first magnet sheet 7 close to the second core sheet 6 constitutes a south pole as depicted in FIG. 8. Thus, the first magnet sheet 7 causes the individual first supporting tabs 5c of the first core sheet 5 to function as north poles (first magnetic poles) and the individual second supporting tabs 6c of the second core sheet 6 to function as south poles (second magnetic poles).

Operation of the second embodiment will now be described.

The first core sheet 5 and the second core sheet 6, which constitute the rotor 4, have the same shape and are formed by punching electromagnetic steel plates made of a soft magnetic material. The rotor 4 includes the first core sheet 5, the second core sheet 6 and the first magnet sheet 7, which is sandwiched between the first and second core sheets 5, 6. The first magnet sheet 7 is magnetized in the axial direction such that the portion of the first magnet sheet 7 close to the first core sheet 5 constitutes the north pole and the portion of the first magnet sheet 7 close to the second core sheet 6 constitutes the south pole.

Consequently, the individual first supporting tabs 5c of the first core sheet 5 function as the north poles, and the second supporting tabs 6c of the second core sheet 6 function as the south poles in the rotor 4.

The second embodiment achieves the below-described advantages.

(1) The first and second core sheets 5, 6 are formed by punching electromagnetic steel plates made of a soft magnetic material. Since plastically deformed parts having a different property are formed in cut surfaces of the first and second core sheets 5, 6 in this structure, leakage flux from the cut surfaces formed by punching operation is reduced.

(2) The first and second core sheets 5, 6 are formed by punching electromagnetic steel plates made of a soft magnetic material. It is therefore possible to shape the first and second supporting tabs 5c, 6c, which serve as the first and second magnetic poles, respectively, with high accuracy and manufacture the rotor 4 by simple machining/assembling processes.

(3) The rotor 4 is produced with the first magnet sheet 7 sandwiched between the first core sheet 5 and the second core sheet 6. It is therefore possible to manufacture the brushless motor 1, which is simply structured and easy to assemble at low cost.

Additionally, the rotor 4 has a simple structure just including the first and second core sheets 5, 6 and the first magnet sheet 7. This structure makes it possible to achieve uniformity of magnetic flux density, which contributes to torque generation, resulting in an improvement in motor output and enabling a further size reduction of small-sized motors.

(4) Since any first and second supporting tabs 5c, 6c located adjacent to each other as viewed in the axial direction are separated from each other in the circumferential direction all the way from the proximal end to the distal end of each of the supporting tabs 5c, 6c, leakage flux is less likely to occur from between any of the first supporting tabs 5c, which function as the north poles, and the adjacent second supporting tabs 6c, which function as the south poles.

(5) The distance LA between the distal ends of the first and second supporting tabs 5c, 6c located circumferentially adjacent to each other is made equal to or larger than the thickness LB of the first core sheet 5 (or the second core sheet 6) measured in the axial direction. Thus, it is possible to prevent the first supporting tabs 5c and the second supporting tabs 6c from going into mutual contact or coming too close to each other in a reliable fashion even if burrs or a displacement of punched pattern occurs during the punching operation, so that leakage flux becomes less likely to occur.

(6) Since the first and second core sheets 5, 6 are formed of electromagnetic steel plates, it is possible to impart stiffness to the rotor 4 and achieve a further cost reduction.

(7) The distance L1 measured from the outer peripheral surface of the first magnet sheet 7 to the distal end of each of the first and second supporting tabs 5c, 6c is larger than the thickness L2 of the first magnet sheet 7 measured in the axial direction. Therefore, a distance measured radially from the outer peripheral surface of the first magnet sheet 7 to outer peripheral surfaces of the first and second supporting tabs 5c, 6c is large. As a result, magnetic fluxes that emerge from the first and second supporting tabs 5c, 6c are kept from being redirected backward toward the rotor 4. This serves to prevent the occurrence of leakage flux and thereby increase the output of the brushless motor 1.

(Third Embodiment)

A third embodiment of the present invention will now be described hereunder with reference to FIGS. 11 to 14.

A rotor 8 according to the third embodiment is characterized in that another magnet sheet is added to the rotor 4 of the second embodiment. Thus, for purposes of illustration, the following discussion describes only this characteristic feature of the embodiment in detail without providing a detailed description of other features that are common with the second embodiment.

Figure 11:
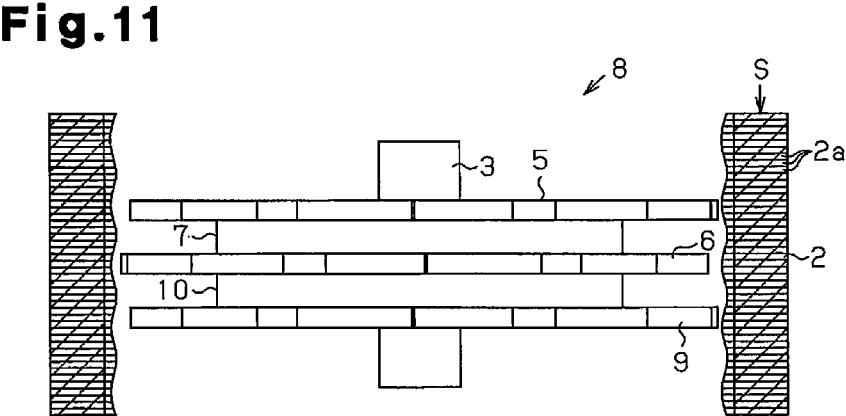
FIG. 11 is a front view of a rotor provided in a brushless motor according to a third embodiment of the present invention.
Figure 12:
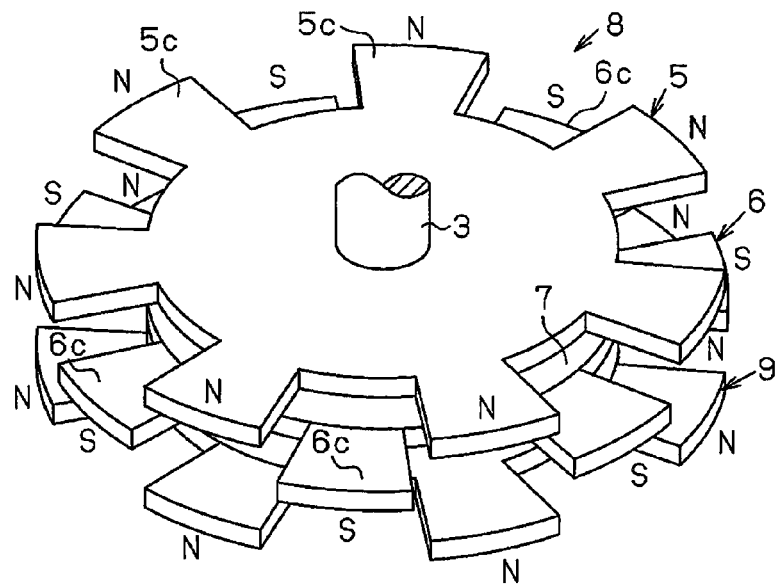
FIG. 12 is a perspective view of the rotor of FIG. 11.

As illustrated in FIG. 11, the rotor 8 of a brushless motor 1 according to the third embodiment includes a third core sheet 9, which serves as a third rotor core and a second magnet sheet 10, which serves as a second field magnet in addition to a first core sheet 5, a second core sheet 6, and a first magnet sheet 7 of the second embodiment.

(Third Core Sheet 9)

Figure 13:
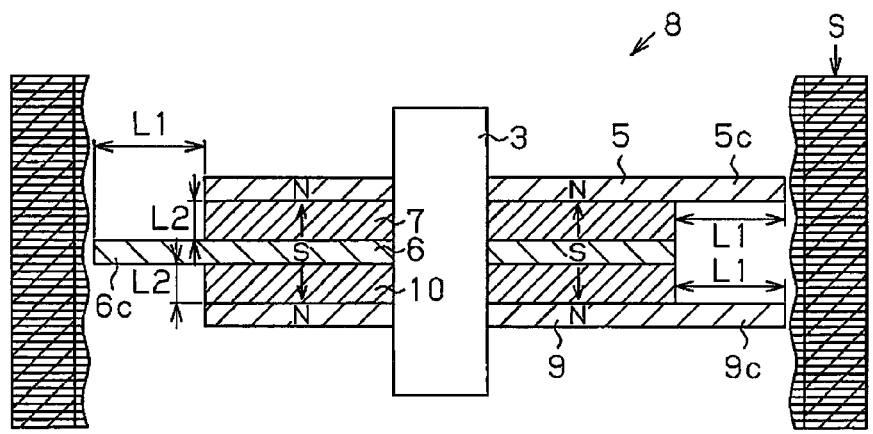
FIG. 13 is a cross-sectional view of the rotor of FIG. 11 as viewed in the axial direction.
Figure 14:
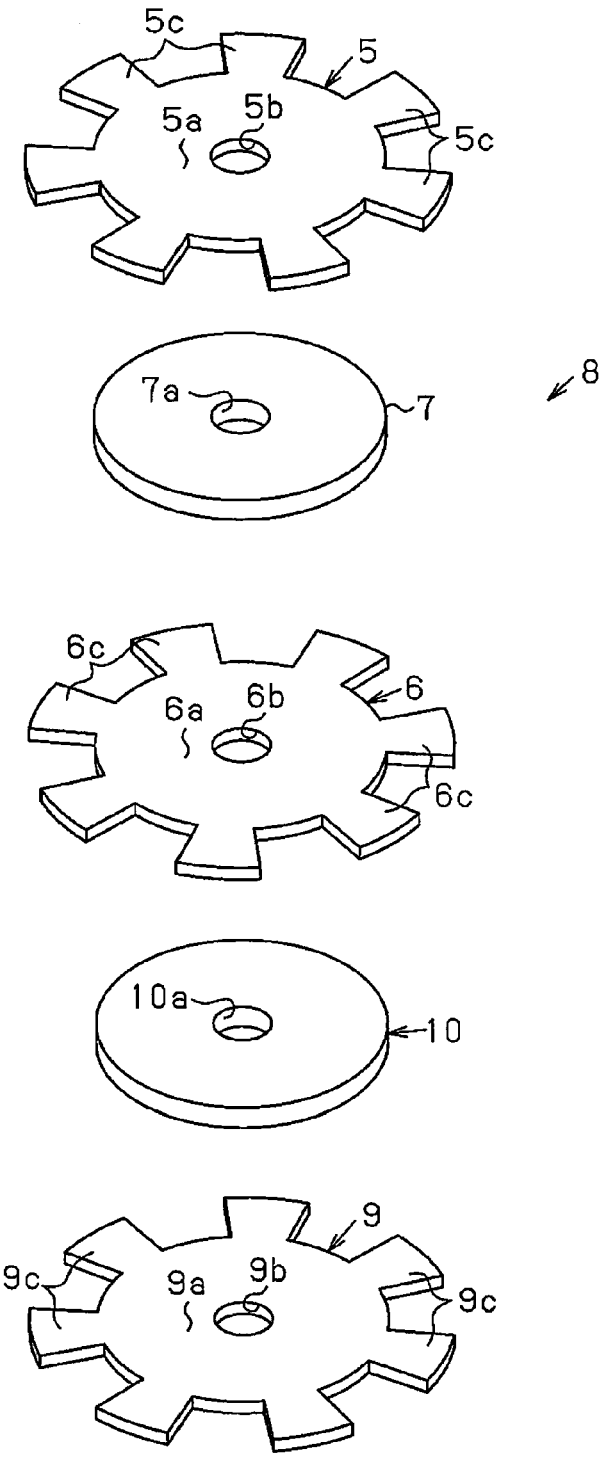
FIG. 14 is an exploded perspective view of the rotor of FIG. 11.

The third core sheet 9 is located beneath the second core sheet 6 as depicted in FIGS. 11 and 13. The third core sheet 9 is formed by punching an electromagnetic steel plate made of the same soft magnetic material as the first core sheet 5 and has the same shape therewith. The third core sheet 9 has a third disk portion 9a as depicted in FIG. 14. A through hole 9b, in which the rotary shaft 3 is fitted, is formed in a central part of the third disk portion 9a. The third disk portion 9a is provided with seven third supporting tabs 9c extending radially outward at equal circumferential intervals from an outer peripheral surface of the third disk portion 9a.

Each of the third supporting tabs 9c is formed to have a width smaller than the distance from one third supporting tab 9c to the next as measured in the circumferential direction. With this arrangement, the third supporting tabs 9c are arranged at equal intervals in the circumferential direction of the third core sheet 9. Thus, the third core sheet 9 has the same shape as the first core sheet 5 including the third supporting tabs 9c, which are configured in the same fashion as the first supporting tabs 5c.

The third core sheet 9 is arranged with respect to the second core sheet 6 and fixed onto the rotary shaft 3 such that the third supporting tabs 9c of the third core sheet 9 are not positioned face to face with the second supporting tabs 6c of the second core sheet 6, that is, each of the third supporting tabs 9c is positioned between two adjacent second supporting tabs 6c as viewed in the axial direction. This means that the third core sheet 9 is so arranged with respect to the first core sheet 5 that the third supporting tabs 9c of the third core sheet 9 are positioned face to face with the respective first supporting tabs 5c of the first core sheet 5 as viewed in the axial direction.
(Second Magnet Sheet 10)

The second magnet sheet 10 is sandwiched between the second core sheet 6 and the third core sheet 9 when the third core sheet 9 is fixedly mounted on the rotary shaft 3. The second magnet sheet 10 is made of the same material as the first magnet sheet 7 of the second embodiment and has the same shape therewith. As depicted in FIG. 14, a through hole 10a, in which the rotary shaft 3 is fitted, is formed in a central part of the second magnet sheet 10. The circular disk-shaped second magnet sheet 10 has an outside diameter equal to that of the first to third disk portions 5a, 6a, 9a of the first to third core sheets 5, 6, 9.

To be more specific, the outside diameter of the second magnet sheet 10 is smaller than the outside diameter of an imaginary cylinder formed by the second and third supporting tabs 6c, 9c, that is, the outside diameter of the second and third core sheets 6, 9 including portions where the second and third supporting tabs 6c, 9c are formed. As depicted in FIG. 13, the distance L1 measured from an outside diameter of the second magnet sheet 10 to the distal end of each of the second and third supporting tabs 6c, 9c is larger than the thickness L2 of the second magnet sheet 10 measured in the axial direction.

The second magnet sheet 10 is magnetized in the axial direction such that a portion of the second magnet sheet 10 close to the third core sheet 9 constitutes a north pole and a portion of the second magnet sheet 10 close to the second core sheet 6 constitutes a south pole as depicted in FIG. 13. Thus, the second magnet sheet 10 causes the individual third supporting tabs 9c of the third core sheet 9 to function as north poles (first magnetic poles) and the individual second supporting tabs 6c of the second core sheet 6 to function as south poles (second magnetic poles).

Operation of the third embodiment will now be described.

The rotor 8 is produced by placing the second magnet sheet 10 beneath the second core sheet 6 of the rotor 4 of the second embodiment and sandwiching the second magnet sheet 10 between the second core sheet 6 and the third core sheet 9.

The second magnet sheet 10 is magnetized such that the portion of the second magnet sheet 10 close to the third core sheet 9 constitutes the north pole and the portion of the second magnet sheet 10 close to the second core sheet 6 constitutes the south pole.

Consequently, in the above-described rotor 8, the south pole of the first magnet sheet 7 and the south pole of the second magnet sheet 10 are oriented to face each other, the north pole of the first magnet sheet 7 is oriented toward the first core sheet 5, and the north pole of the second magnet sheet 10 is oriented toward the third core sheet 9. It is therefore possible to cancel out magnetic forces produced in the axial direction and maintain a magnetic balance in the entire rotor 8.

The third embodiment thus far described achieves the following advantages in addition to the advantages of the second embodiment.

(1) The rotor 8 is produced with the first magnet sheet 7 sandwiched between the first core sheet 5 and the second core sheet 6 and the second magnet sheet 10 sandwiched between the second core sheet 6 and the third core sheet 9. It is therefore possible to achieve uniformity of magnetic flux density, which contributes to torque generation using a simple structure, resulting in an improvement in motor output. This makes it possible to manufacture the brushless motor 1, which is easy to assemble at low cost.

In addition, the rotor 8 is made up of the first to third core sheets 5, 6, 9 and the first and second magnet sheets 7, 10. This structure makes it possible to achieve a further size reduction of small-sized motors.

(2) Since the first to third core sheets 5, 6, 9 are formed of electromagnetic steel plates, it is possible to impart stiffness to the rotor 4 and achieve a further cost reduction.

(3) The first magnet sheet 7 is magnetized such that the portion of the first magnet sheet 7 close to the first core sheet 5 constitutes the north pole and the portion of the first magnet sheet 7 close to the second core sheet 6 constitutes the south pole, while the second magnet sheet 10 is magnetized such that the portion of the second magnet sheet 10 close to the third core sheet 9 constitutes the north pole and the portion of the second magnet sheet 10 close to the second core sheet 6 constitutes the south pole.

It is therefore possible to cancel out magnetic forces produced in the axial direction and maintain a magnetic balance in the entire rotor 8. Moreover, the motor 1 is made to generate a higher output because the second magnet sheet 10 additionally provided serves to correspondingly increase the amount of magnetic flux.

(4) The distance L1 measured radially from the outer peripheral surface of the second magnet sheet 10 to the distal end of each of the second and third supporting tabs 6c, 9c is larger than the thickness L2 of the second magnet sheet 10 measured in the axial direction. Therefore, a distance measured radially from the outer peripheral surface of the second magnet sheet 10 to outer peripheral surfaces of the second and third supporting tabs 6c, 9c is large. This structure achieves an advantage that magnetic fluxes that emerge from the second and third supporting tabs 6c, 9c are kept from being redirected backward toward the rotor 4 in addition to the advantage (4) of the second embodiment. This serves to prevent the occurrence of leakage flux and thereby increase the output of the brushless motor 1.

Figure 15:
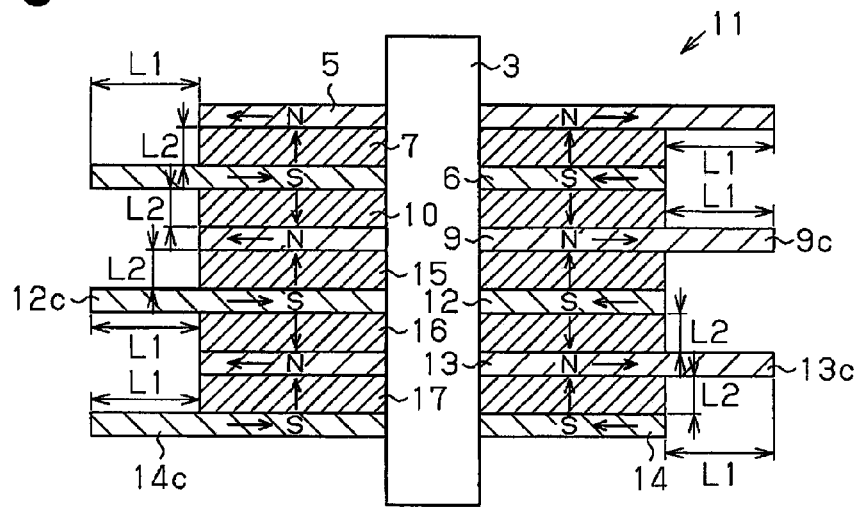
FIG. 15 is a cross-sectional view of a rotor in a modification of the third embodiment.

Although the rotor 8 is configured to include a pair of magnet sheets, that is, the first and second magnet sheets 7, 10 in the third embodiment, the configuration of the third embodiment may be applied to a rotor having a multi-layered structure including an increased number of magnet sheets and a correspondingly increased number of core sheets as illustrated in FIG. 15.

A rotor 11 depicted in FIG. 15 includes three additional core sheets, or fourth to sixth core sheet 12, 13, 14, as well as three additional magnet sheets, or third to fifth magnet sheets 15, 16, 17, besides the first to third core sheets 5, 6, 9 and the first and second magnet sheets 7, 10.

The fourth to sixth core sheets 12, 13, 14 are made of the same material and formed into the same shape as the first core sheet 5. Also, the third to fifth magnet sheets 15, 16, 17 are manufactured with the same material and have the same shape as the first magnet sheet 7.

Beneath the third core sheet 9, the third magnet sheet 15, the fourth core sheet 12, the fourth magnet sheet 16, the fifth core sheet 13, the fifth magnet sheet 17 and the sixth core sheet 14 are arranged in this order downward in the axial direction. According to this arrangement, the third magnet sheet 15 is sandwiched between the third core sheet 9 and the fourth core sheet 12 and the fourth magnet sheet 16 is sandwiched between the fourth core sheet 12 and the fifth core sheet 13. Additionally, the fifth magnet sheet 17 is sandwiched between the fifth core sheet 13 and the sixth core sheet 14.

In this structure, the fourth core sheet 12 and the sixth core sheet 14 are so arranged with respect to the second core sheet 6 that fourth and sixth supporting tabs 12c, 14c of the fourth and sixth core sheets 12, 14 are positioned face to face with the second supporting tabs 6c of the second core sheet 6, respectively, in the axial direction. Also, the fifth core sheet 13 is so arranged with respect to the first and third core sheets 5, 9 that fifth supporting tabs 13c of the fifth core sheet 13 are positioned face to face with the first and third supporting tabs 5c, 9c of the first and third core sheets 5, 9, respectively, in the axial direction.

The third magnet sheet 15 sandwiched between the third core sheet 9 and the fourth core sheet 12 is magnetized such that a portion of the third magnet sheet 15 close to the third core sheet 9 constitutes a north pole and a portion of the third magnet sheet 15 close to the fourth core sheet 12 constitutes a south pole. Thus, the third magnet sheet 15 causes the individual third supporting tabs 9c of the third core sheet 9 to function as north poles (first magnetic poles) and the individual fourth supporting tabs 12c of the fourth core sheet 12 to function as south poles (second magnetic poles).

Also, the fourth magnet sheet 16 sandwiched between the fourth core sheet 12 and the fifth core sheet 13 is magnetized such that a portion of the fourth magnet sheet 16 close to the fifth core sheet 13 constitutes a north pole and a portion of the fourth magnet sheet 16 close to the fourth core sheet 12 constitutes a south pole. Thus, the fourth magnet sheet 16 causes the individual fourth supporting tabs 12c of the fourth core sheet 12 to function as south poles (second magnetic poles) and the individual fifth supporting tabs 13c of the fifth core sheet 13 to function as north poles (first magnetic poles).

Further, the fifth magnet sheet 17 sandwiched between the fifth core sheet 13 and the sixth core sheet 14 is magnetized such that a portion of the fifth magnet sheet 17 close to the sixth core sheet 14 constitutes a south pole and a portion of the fifth magnet sheet 17 close to the fifth core sheet 13 constitutes a north pole. Thus, the fifth magnet sheet 17 causes the individual sixth supporting tabs 14c of the sixth core sheet 14 to function as south poles (second magnetic poles) and the individual fifth supporting tabs 13c of the fifth core sheet 13 to function as north poles (first magnetic poles).

Thus, the magnetic poles produced by the first to fifth magnet sheets 7, 10, 15, 16, 17 are oriented such that the magnetic poles having the same polarity are oriented to face each other in this case as well. It is therefore possible to cancel out magnetic forces produced in the axial direction and maintain a magnetic balance in the entire rotor 11. Moreover, the motor 1 is made to generate a higher output because the third to fifth magnet sheets 15, 16, 17 additionally provided serve to increase the amount of magnetic flux correspondingly.

In addition, the distance L1 measured radially from outer peripheral surfaces of the third to fifth magnet sheets 15, 16, 17 to each of the fourth to sixth supporting tabs 12c, 13c, 14c of the fourth to sixth core sheets 12, 13, 14 is larger than the thickness L2 of each of the third to fifth magnet sheets 15, 16, 17 measured in the axial direction as is the case with the first and second core sheets 5, 6. Therefore, magnetic fluxes that emerge from the fourth to sixth supporting tabs 12c, 13c, 14c are kept from being redirected backward toward the rotor 4. This serves to prevent the occurrence of leakage flux and thereby increase the output of the motor 1.

(Fourth Embodiment)

A fourth embodiment of the present invention will now be described hereunder with reference to FIGS. 16 to 18.

A rotor 20 according to the fourth embodiment is characterized in a joint structure used for joining first and second core sheets 5, 6 of the rotor 4 that are essentially the same as those of the second embodiment. Thus, for purposes of illustration, the following discussion describes only this characteristic feature of the embodiment in detail without providing a detailed description of other features that are common with the foregoing embodiments.

Figure 16:
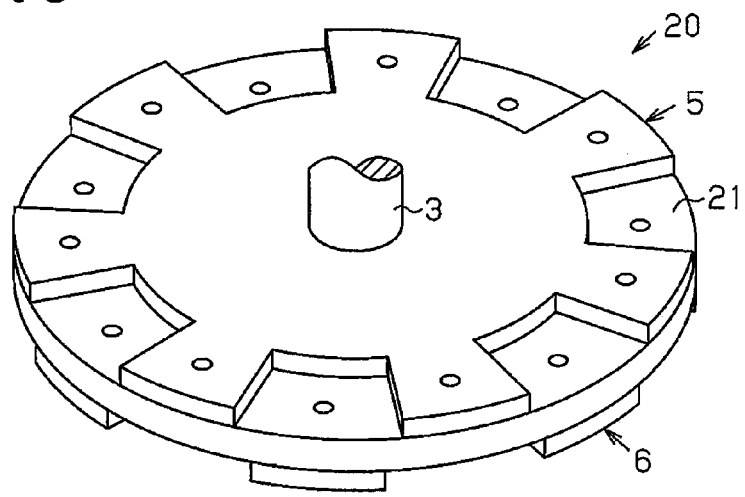
FIG. 16 is a perspective view of a rotor provided in a brushless motor according to a fourth embodiment of the present invention.
Figure 17:
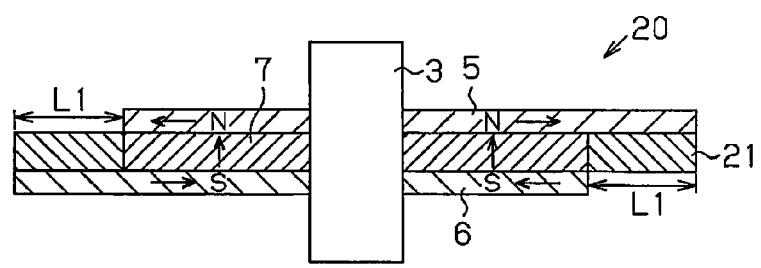
FIG. 17 is a cross-sectional view of the rotor of FIG. 16.
Figure 18:
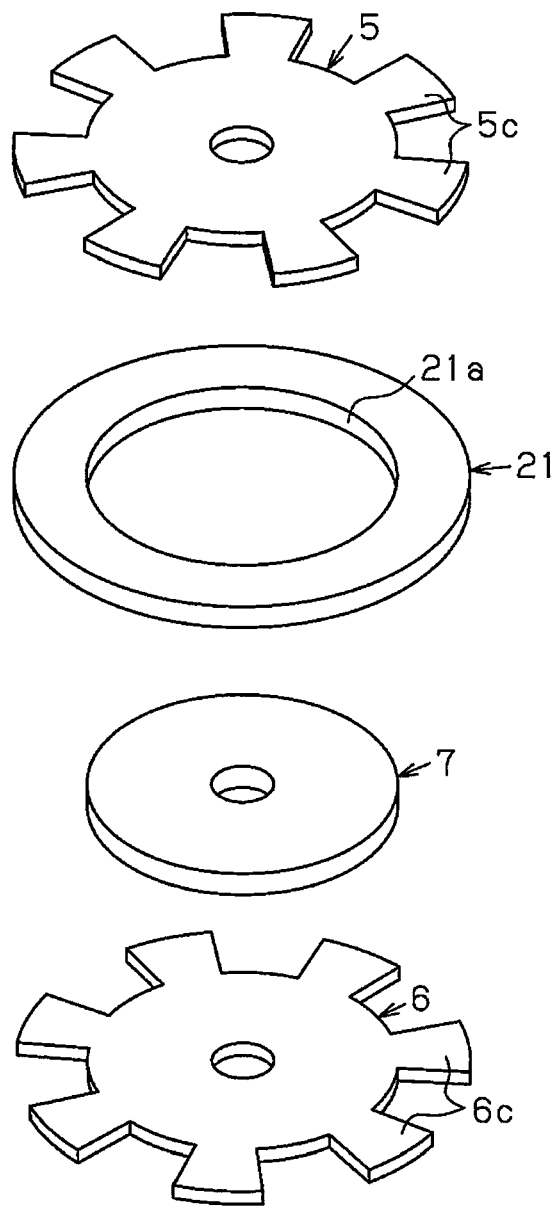
FIG. 18 is an exploded perspective view of the rotor of FIG. 16.

As illustrated in FIGS. 16 to 18, the rotor 20 of a brushless motor 1 according to the fourth embodiment includes a first annular coupling plate 21 in addition to the first core sheet 5, the second core sheet 6, and the first magnet sheet 7 of the second embodiment.

The first annular coupling plate 21 is made of a nonmagnetic material and has a thickness of L2, which is the same as that of the first magnet sheet 7. The first annular coupling plate 21 has a fitting hole 21a formed in a central part thereof. This fitting hole 21a has an inside diameter equal to the outside diameter of the first magnet sheet 7, allowing the first magnet sheet 7 to be fitted in the fitting hole 21a of the first annular coupling plate 21.

The first annular coupling plate 21 has an outside diameter equal to the outside diameter of the first and second supporting tabs 5c, 6c of the first and second core sheets 5, 6. In the fourth embodiment, the distance L1 measured radially from the outer peripheral surface of the magnet sheet 7 to the distal end of each of the first and second supporting tabs 5c, 6c is larger than the thickness L2 of the first magnet sheet 7.

Under conditions where the first magnet sheet 7 is fitted in the fitting hole 21a, the first annular coupling plate 21 is positioned between the first core sheet 5 and the second core sheet 6. In this state, the first annular coupling plate 21 is fixedly joined to the individual first and second supporting tabs 5c, 6c of the first and second core sheets 5, 6 by swaging.

Operation of the fourth embodiment will now be described.

The rotor 20 includes the first annular coupling plate 21, in which the first magnet sheet 7 is fitted between the first core sheet 5 and the second core sheet 6. The first annular coupling plate 21 is fixedly joined to the first and second core sheets 5, 6 by swaging the first annular coupling plate 21 and the individual first and second supporting tabs 5c, 6c of the first and second core sheets 5, 6 together.

The fourth embodiment discussed above achieves the below-described advantages in addition to the advantages of the second embodiment.

(1) The rotor 20 includes the first annular coupling plate 21 placed between the first core sheet 5 and the second core sheet 6. Since the first annular coupling plate 21 is fixedly joined to the first and second core sheets 5, 6 by swaging, it is possible to firmly join the first and second core sheets 5, 6 together by using a simple structure.

The above-described structure of the fourth embodiment may also be applied to the rotor 8 provided with a pair of magnet sheets described in the third embodiment, or the first and second magnet sheets 7, 10.

Figure 19:
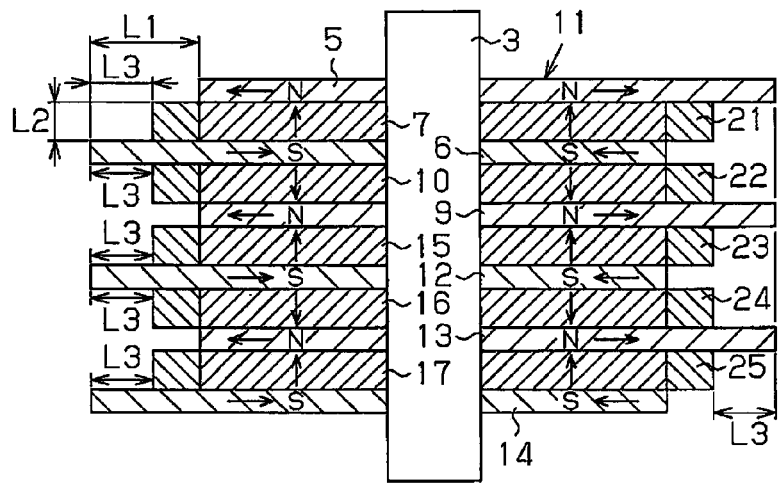
FIG. 19 is a cross-sectional view of a rotor in a modification of the fourth embodiment.

Furthermore, second to fifth annular coupling plates 22, 23, 24, 25 may be provided in the rotor 11 of FIG. 15 having the multi-layered structure including an increased number of magnet sheets and a correspondingly increased number of core sheets as illustrated in FIG. 19. In this case, the outside diameter of the annular coupling plates 21, 22, 23, 24, 25 is made smaller than the outside diameter of the core sheets 5, 6, 9, 12, 13, 14 by as much as a length L3.

(Fifth Embodiment)

A fifth embodiment of the present invention will now be described hereunder with reference to FIGS. 20 to 22.

A rotor 30 of the fifth embodiment is characterized in that a first core sheet 5 and a second core sheet 6 of the rotor 4 of the second embodiment. For purposes of illustration, the following discussion describes only this characteristic feature of the embodiment in detail without providing a detailed description of other features that are common with the foregoing embodiments.

Figure 20:
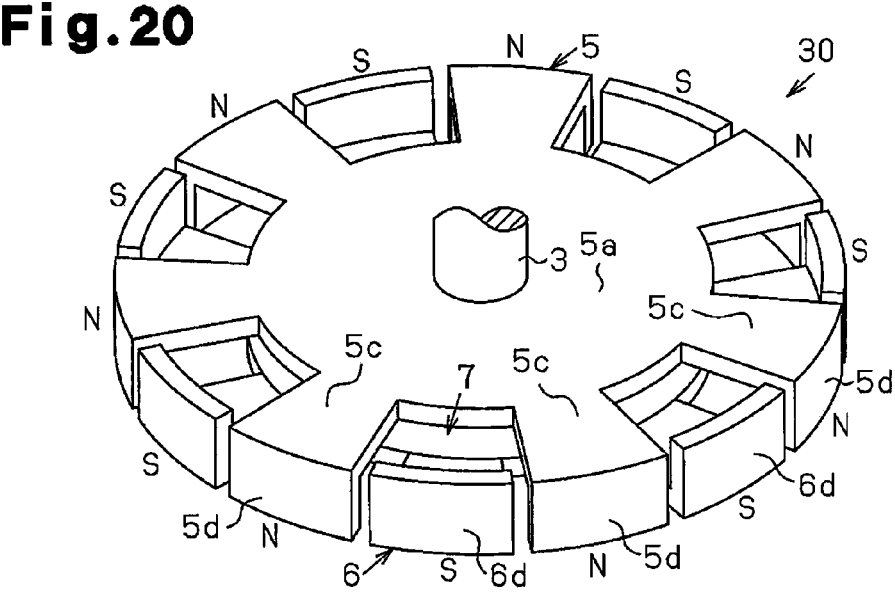
FIG. 20 is a perspective view of a rotor according to a fifth embodiment of the present invention.
Figure 21:
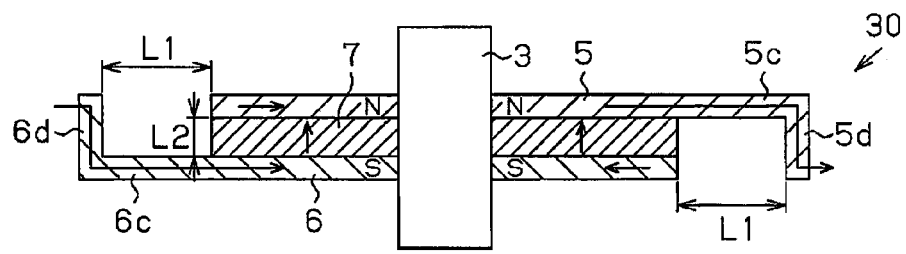
FIG. 21 is a cross-sectional view of the rotor of FIG. 20 as viewed in the axial direction.
Figure 22:
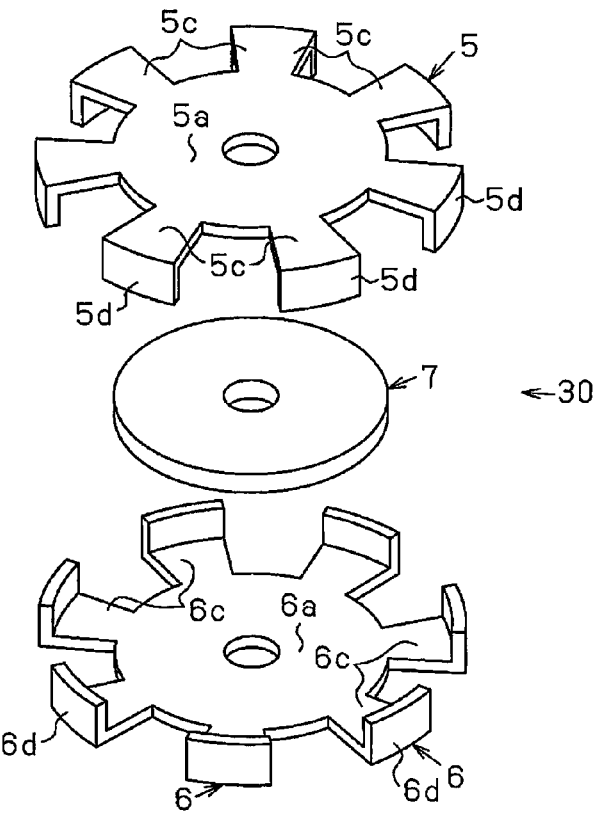
FIG. 22 is an exploded perspective view of the rotor of FIG. 20.

As illustrated in FIGS. 20 to 22, the rotor 30 of a brushless motor 1 according to the fifth embodiment includes the first core sheet 5 and the second core sheet 6 of the second embodiment as well as a first magnet sheet 7 having a thickness L2, which is sandwiched between the first core sheet 5 and the second core sheet 6.

The first core sheet 5 includes a first disk portion 5*a*, seven first supporting tabs 5*c* extending radially outward by a distance L1 from an outer peripheral surface of the first disk portion 5*a*, and first claw poles 5*d* extending from arc-shaped distal ends of the individual first supporting tabs 5*c* toward the second core sheet 6. Radially outer peripheral surfaces of the individual first claw poles 5*d* are positioned face to face with a curved inside surface of a stator, which is not illustrated. Each of axial ends of the first claw poles 5*d* extends in the axial direction up to a position where a surface of the second core sheet 6 on a side thereof opposite to the first core sheet 5 is located.

The second core sheet 6 includes a second disk portion 6*a*, seven second supporting tabs 6*c* extending radially outward by a distance L1 from an outer peripheral surface of the second disk portion 6*a*, and second claw poles 6*d* extending from arc-shaped distal ends of the individual second supporting tabs 6*c* toward the first core sheet 5. Outer peripheral surfaces of the individual second claw poles 6*d* are positioned face to face with the curved inside surface of the stator, which is not illustrated. Each of axial ends of the second claw poles 6*d* extends in the axial direction up to a position where a surface of the first core sheet 5 on a side thereof opposite to the second core sheet 6 is located.

Under conditions where the first core sheet 5 and the second core sheet 6 are overlapped with the first magnet sheet 7 sandwiched in between, seven each first claw poles 5*d* and second claw poles 6*d* are alternately disposed in the circumferential direction.

The first and second core sheets 5, 6 are both formed by punching electromagnetic steel plates made of a soft magnetic material. More specifically, the first and second disk portions 5*a*, 6*a*, the first and second supporting tabs 5*c*, 6*c*, and portions further extending radially outward from the first and second supporting tabs 5*c*, 6*c* are first formed in this punching process. Then, the first and second claw poles 5*d*, 6*d* of the respective first and second core sheets 5, 6 are formed by bending the aforementioned extensions in the axial direction.

Operation of the fifth embodiment will now be described.

The rotor 30 includes the first claw poles 5*d* formed at the distal ends of the individual first supporting tabs 5*c* of the first core sheet 5 and the second claw poles 6*d* formed at the distal ends of the individual second supporting tabs 6*c* of the second core sheet 6.

Thus, the first claw poles 5*d* function as north poles while the second claw poles 6*d* function as south poles. It is therefore possible to suppress the occurrence of leakage flux from the first magnet sheet 7 and utilize magnetic flux produced by the first magnet sheet 7 more effectively.

Furthermore, the first claw poles 5*d* and the second claw poles 6*d* are separated from the outer peripheral surface of the first magnet sheet 7, so that there is created a gap between each of the first and second claw poles 5*d*, 6*d* and the first magnet sheet 7. This arrangement serves to prevent the occurrence of a short circuit of magnetic flux between the first and second claw poles 5*d*, 6*d* and the first magnet sheet 7.

The fifth embodiment discussed above achieves the below-described advantages in addition to the advantages of the second embodiment.

The rotor 30 includes the first claw poles 5*d* formed on the first core sheet 5 and the second claw poles 6*d* formed on the second core sheet 6. This structure serves to reduce leakage flux from the first magnet sheet 7, making it possible to utilize the magnetic flux produced by the first magnet sheet 7 more effectively and increase motor output.

Figure 23:
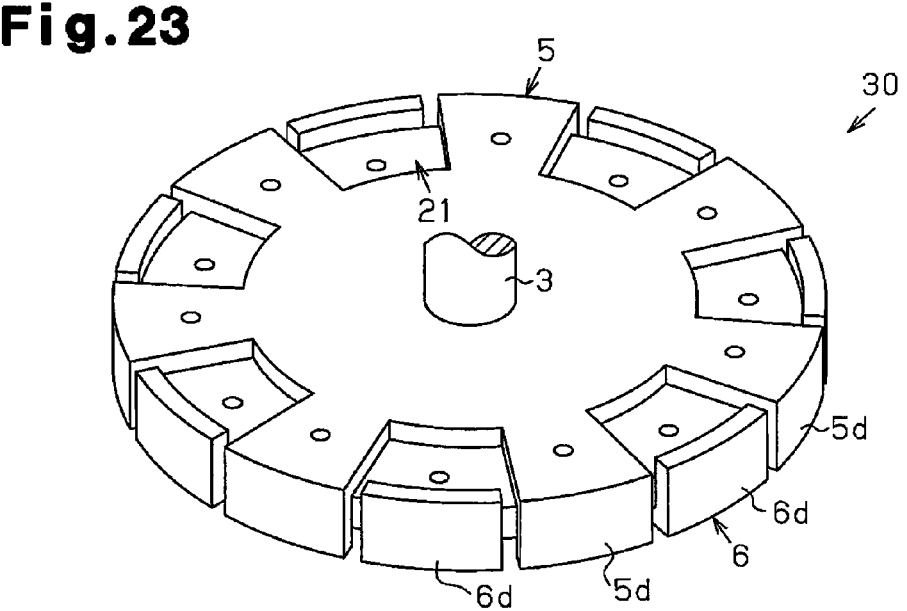
FIG. 23 is a perspective view of a rotor in a modification of the fifth embodiment.

The fifth embodiment may be so modified that a first annular coupling plate 21 like the one discussed in the fourth embodiment is placed between the first core sheet 5 and the second core sheet 6 and fixedly joined thereto by swaging the first annular coupling plate 21 and the first and second core sheets 5, 6 together as depicted in FIG. 23.

(Sixth Embodiment)

A sixth embodiment of the present invention will now be described hereunder with reference to FIGS. 24 to 26.

A rotor 40 of the sixth embodiment is characterized in that this rotor 40 is configured by stacking a pair of rotors 30 of the fifth embodiment in the axial direction. Thus, for purposes of illustration, the following discussion describes only this characteristic feature of the embodiment in detail without providing a detailed description of other features that are common with the foregoing embodiments.

Figure 24:
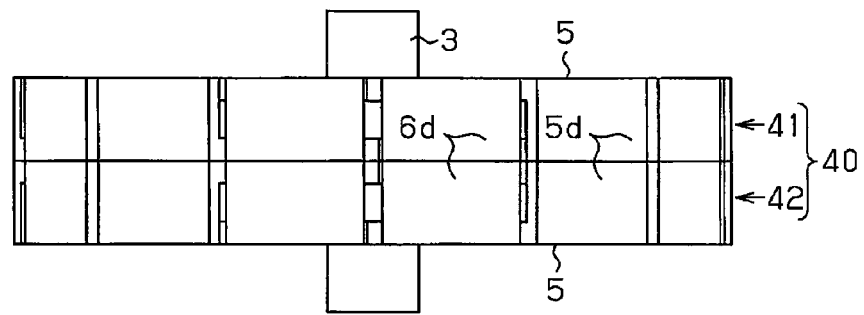
FIG. 24 is a front view of a rotor according to a sixth embodiment of the present invention.
Figure 25:
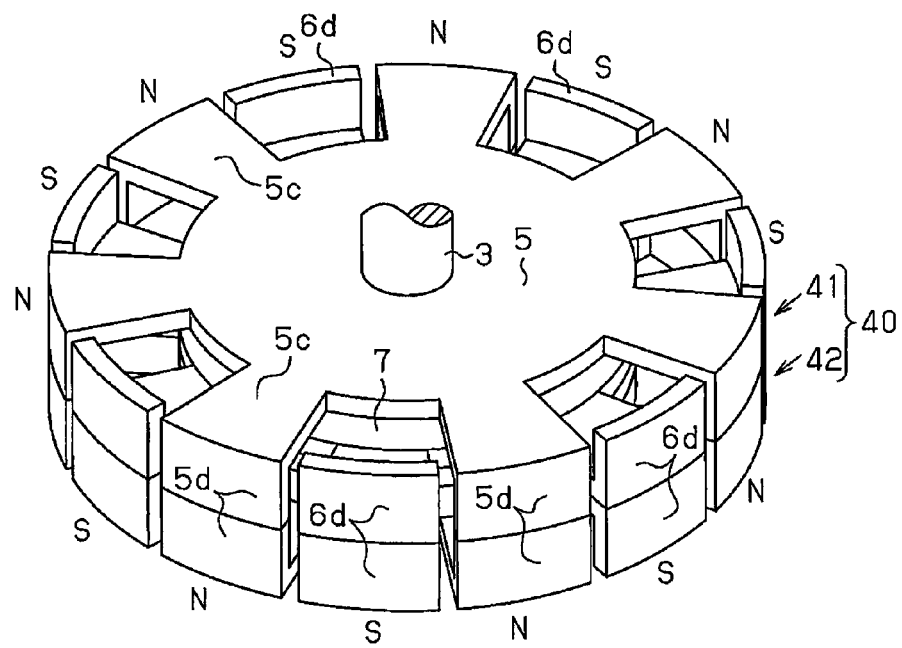
FIG. 25 is a perspective view of the rotor of FIG. 24.
Figure 26:
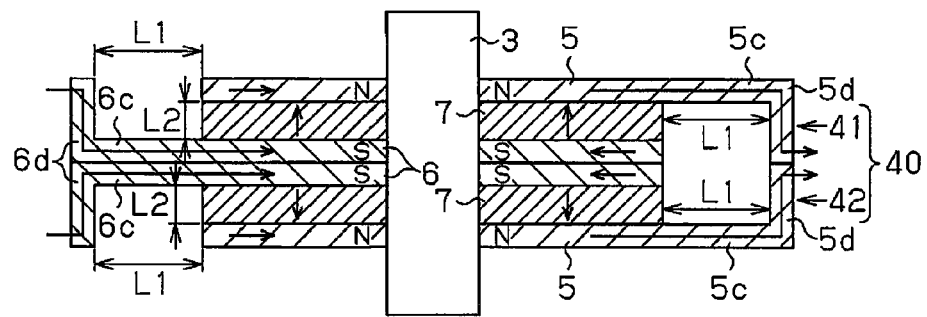
FIG. 26 is a cross-sectional view of the rotor of FIG. 24 as viewed in the axial direction.

As illustrated in FIGS. 24 to 26, the rotor 40 of a brushless motor 1 according to the sixth embodiment includes an upper rotor 41 and a lower rotor 42.

The upper rotor 41 includes a first core sheet 5 having first claw poles 5*d*, a second core sheet 6 having second claw poles 6*d* and a first magnet sheet 7 like the rotor 30 of the fifth embodiment.

The lower rotor 42 also includes a first core sheet 5 having first claw poles 5*d*, a second core sheet 6 having second claw poles 6*d* and a first magnet sheet 7 like the rotor 30 of the fifth embodiment.

The rotor 40 is configured by stacking the upper rotor 41 on top of the lower rotor 42 in the axial direction such that the second core sheet 6 of the upper rotor 41 lies in contact with the second core sheet 6 of the lower rotor 42. The rotor 40 is fixedly mounted on a rotary shaft 3.

Operation of the sixth embodiment will now be described.

The rotor 40 has a tandem structure configured by stacking the upper rotor 41 and the lower rotor 42 having the same shape in the axial direction. It is therefore possible to produce a compact motor capable of producing an increased output.

The upper rotor 41 and the lower rotor 42 are manufactured from the same materials and have the same shape. This facilitates component management and assembly particularly during a process of assembling the rotor 40.

The sixth embodiment discussed above achieves the below-described advantages in addition to the advantages of the fifth embodiment.

It is possible to easily assemble the rotor 40 and manufacture a compact motor capable of producing an increased output.

Figure 27:
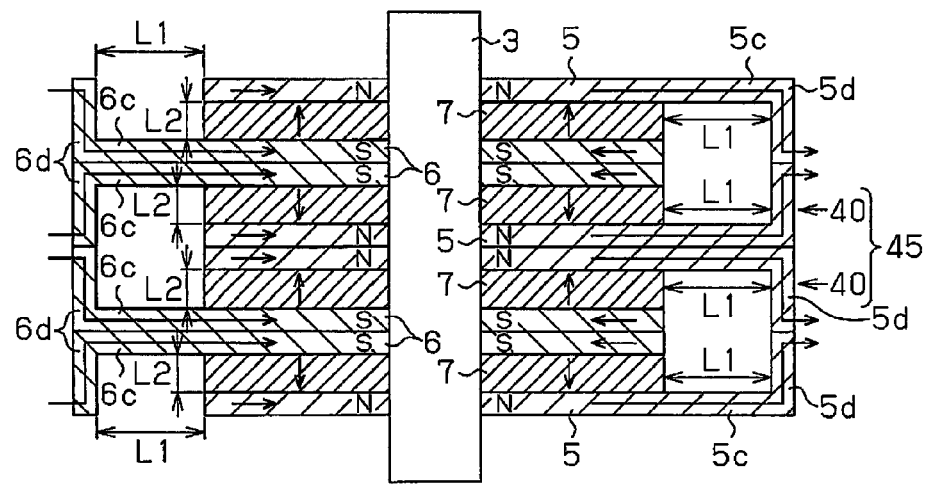
FIG. 27 is a cross-sectional view of a rotor in a modification of the sixth embodiment.

A pair of rotors 40 of the present embodiment may be stacked in the axial direction to produce a tandem-structured rotor 45 as illustrated in FIG. 27. This structure makes it possible to easily assemble a motor featuring further compactness and larger output.

(Seventh Embodiment)

A seventh embodiment of the present invention will now be described hereunder with reference to FIGS. 28 to 30.

A rotor 50 of the seventh embodiment is characterized in that a ring-shaped magnet is placed to surround a first magnet sheet 7 like that of the rotor 30 of the fifth embodiment (refer to FIG. 20). Thus, for purposes of illustration, the following discussion describes only this characteristic feature of the embodiment in detail without providing a detailed description of other features that are common with the foregoing embodiments.

Figure 28:
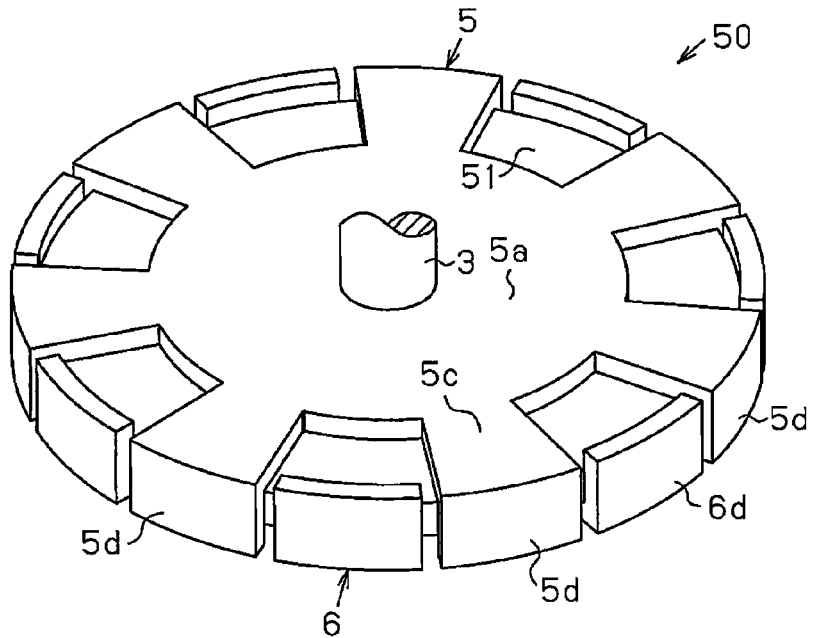
FIG. 28 is a perspective view of a rotor according to a seventh embodiment of the present invention.
Figure 29:
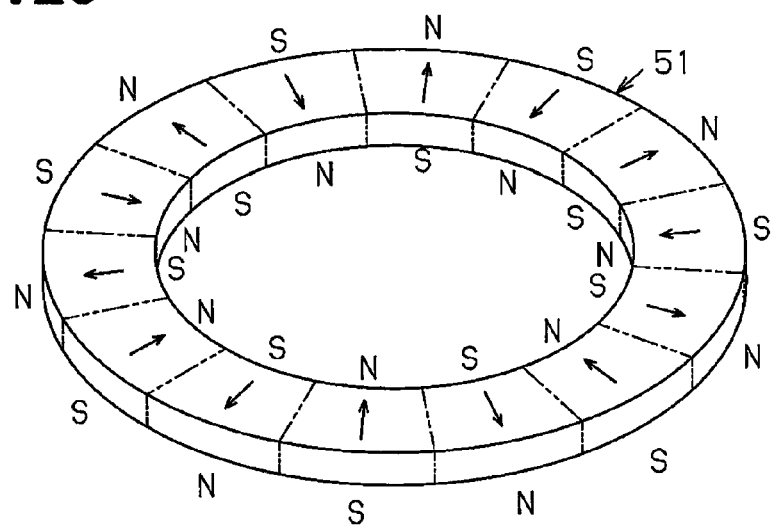
FIG. 29 is a perspective view of an annular auxiliary magnet provided in the rotor of FIG. 28.
Figure 30:
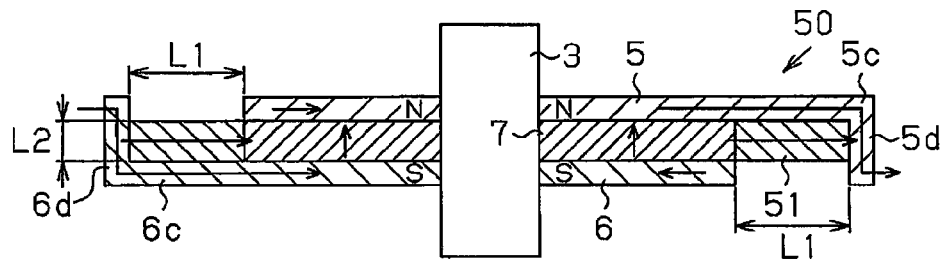
FIG. 30 is a cross-sectional view of the rotor of FIG. 28 as viewed in the axial direction.

As illustrated in FIGS. 28 to 30, in the rotor 50 of a brushless motor 1 according to the seventh embodiment, an annular auxiliary magnet 51 is placed between an outer peripheral surface of the first magnet sheet 7 and curved inside surfaces of first and second claw poles 5*d*, 6*d*. The annular auxiliary magnet 51 is made of the same material as the first magnet sheet 7 and has the same thickness L2 as the first magnet sheet 7.

The annular auxiliary magnet 51 is held in position by the outer peripheral surface of the first magnet sheet 7 and the curved inside surfaces of the first and second claw poles 5*d*, 6*d* in radial directions. Also, the annular auxiliary magnet 51 is held in position by first supporting tabs 5*c* of the first core sheet 5 and second supporting tabs 6*c* of the second core sheet 6 in the axial direction.

The annular auxiliary magnet 51 is radially magnetized. Specifically, the annular auxiliary magnet 51 is divided into fourteen segmental regions, which are arranged at equal intervals in a circumferential direction. Curved outside surfaces of these segmental regions of the annular auxiliary magnet 51 are held in contact with the curved inside surfaces of the respective first or second claw poles 5*d*, 6*d*.

Among the aforementioned regions of the annular auxiliary magnet 51, a plurality of first regions of which curved outside surfaces are in contact with the first claw poles 5*d* are magnetized such that portions of the first regions close to the first claw poles 5*d* constitute north poles and portions of the first regions close to the first magnet sheet 7 constitute south poles. Also, a plurality of second regions of which curved outside surfaces are in contact with the second claw poles 6*d* are magnetized such that portions of the second regions close to the second claw poles 6*d* constitute south poles and portions of the second regions close to the first magnet sheet 7 constitute north poles. This means that the annular auxiliary magnet 51 is magnetized such that oppositely oriented magnetic poles are alternately arranged in the circumferential direction.

Operation of the seventh embodiment will now be described.

The rotor 50 includes the annular auxiliary magnet 51 placed between the outer peripheral surface of the first magnet sheet 7 and the curved inside surfaces of the first and second claw poles 5*d*, 6*d*. The annular auxiliary magnet 51 is divided into the segmental regions, which are arranged at equal intervals in the circumferential direction, the individual regions forming the magnetic poles oriented in the same pole directions as the corresponding first claw poles 5*d* and second claw poles 6*d*.

This arrangement serves to enhance magnetic fluxes produced by the individual first and second claw poles 5*d*, 6*d*, which are alternately arranged in the circumferential direction, making it possible to achieve an increase in motor output.

The seventh embodiment discussed above achieves the below-described advantages in addition to the advantages of the fourth embodiment.

It is possible to manufacture a compact motor capable of producing a further increased output.

Figure 31:
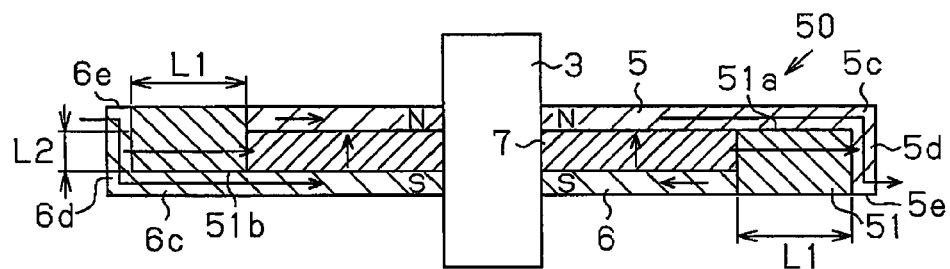
FIG. 31 is a cross-sectional view of a rotor in a modification of the seventh embodiment.

The annular auxiliary magnet 51 may be shaped to become flush with axial end surfaces 5*e*, 6*e* of the first and second claw poles 5*d*, 6*d*, respectively, as depicted in FIG. 31. In this case, the annular auxiliary magnet 51 has first fitting portions 51*a*, on which the first supporting tabs 5*c* are fitted, the first fitting portions 51*a* being formed at circumferential positions corresponding to the first supporting tabs 5*c*, as well as second fitting portions 51*b*, on which the second supporting tabs 6*c* are fitted, the second fitting portions 51*b* being formed at circumferential positions corresponding to the second supporting tabs 6*c*.

Expressed briefly, the first fitting portions 51*a*, on which the first supporting tabs 5*c* are fitted, are formed on a first axial end surface of the annular auxiliary magnet 51 while the second fitting portions 51*b*, on which the second supporting tabs 6*c* are fitted, are formed on a second axial end surface of the annular auxiliary magnet 51.

This arrangement makes it possible to prevent the occurrence of leakage flux and further increase the output of the motor 1.

Figure 32:
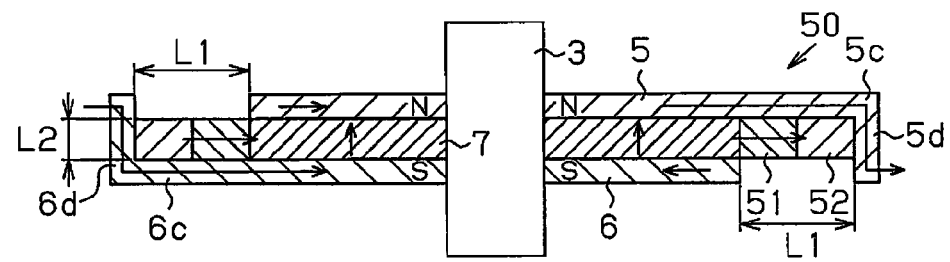
FIG. 32 is a cross-sectional view of a rotor in another modification of the seventh embodiment.

Although one annular auxiliary magnet 51 is placed between the outer peripheral surface of the first magnet sheet 7 and the curved inside surface of corresponding one of the first and second claw poles 5*d*, 6*d* in the rotor 50 of the seventh embodiment, a ring-shaped nonmagnetic plate 52 made of a nonmagnetic material may be located radially outside the annular auxiliary magnet 51 as depicted in FIG. 32. In this case, the annular auxiliary magnet 51 has an outside diameter that is made smaller by an amount needed for fitting the nonmagnetic plate 52.

The nonmagnetic plate 52 serves to increase stiffness of the rotor 50 and prevent leakage flux in radial directions of the first magnet sheet 7.

Figure 33:
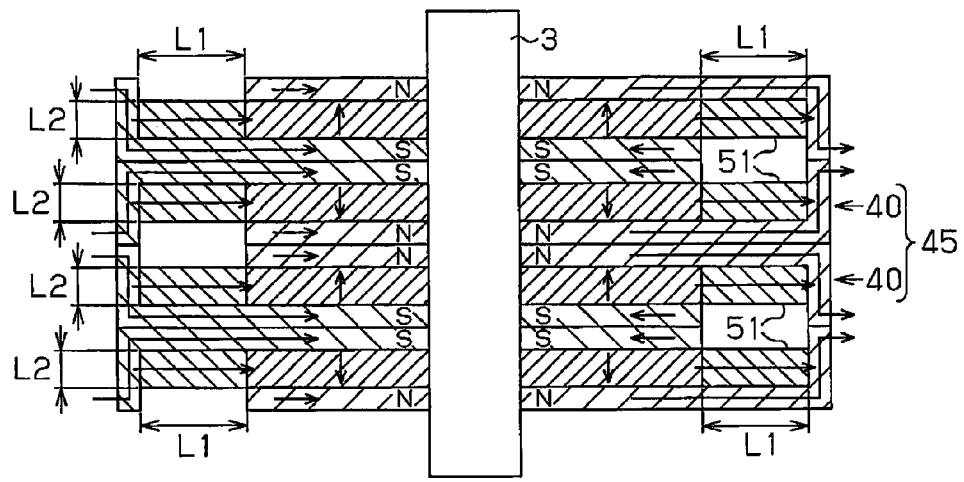
FIG. 33 is a cross-sectional view of a rotor in another modification of the seventh embodiment.

The annular auxiliary magnet 51 of the seventh embodiment may be arranged to surround each of the first magnet sheets 7 of the rotor 45 of FIG. 27 having the multi-layered structure as depicted in FIG. 33. Needless to say, a ring-shaped disk made of a nonmagnetic material may be provided instead of the aforementioned annular auxiliary magnet 51.

Figure 34:
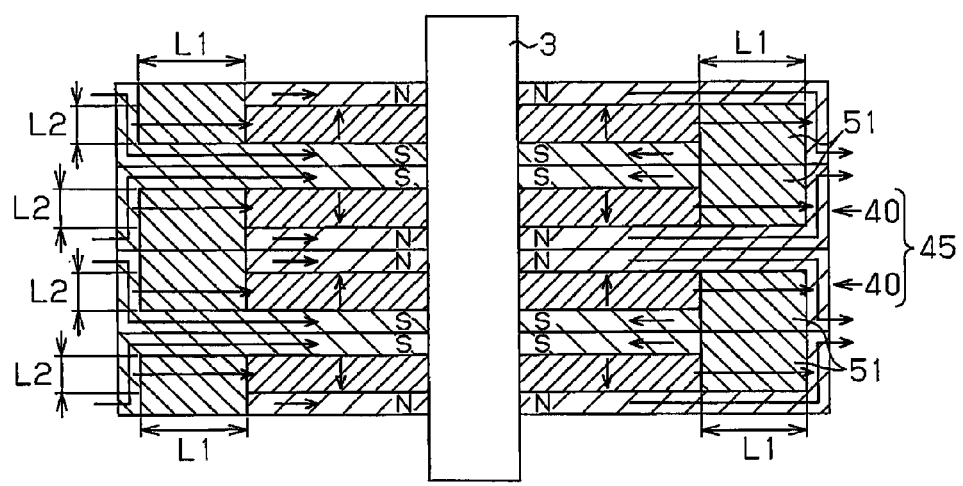
FIG. 34 is a cross-sectional view of a rotor in another modification of the seventh embodiment.

Furthermore, the rotor 50 provided with the annular auxiliary magnet 51 illustrated as a modification of the seventh embodiment of FIG. 31 may be implemented in the multi-layered rotor 45 presented in FIG. 27 as depicted in FIG. 34. Also, instead of providing the annular auxiliary magnet 51, a plurality of auxiliary magnets that are so segmented as to correspond individually to the first and second claw poles 5*d*, 6*d* may be provided with the auxiliary magnets displaced in the axial direction.

Figure 35:
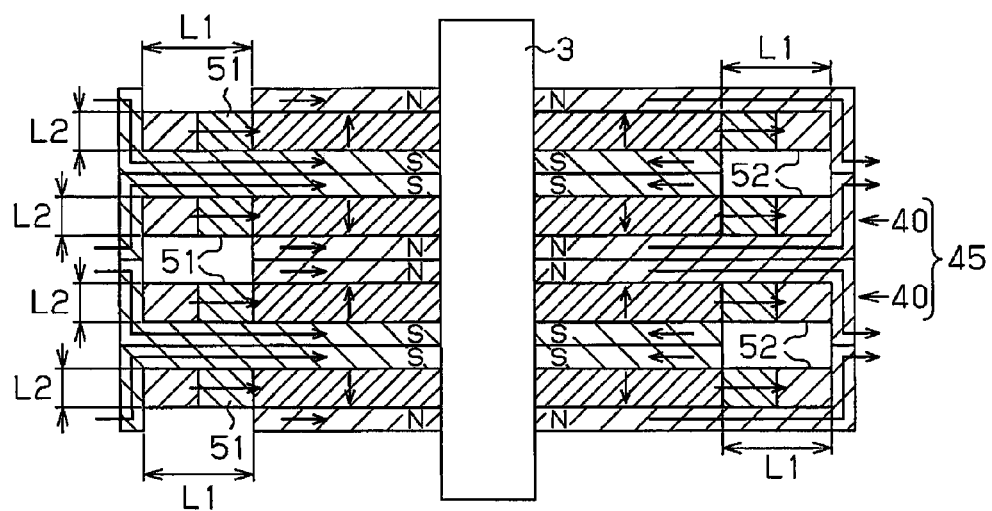
FIG. 35 is a cross-sectional view of a rotor in still another modification of the seventh embodiment.

Also, a double ring structure formed by the annular auxiliary magnet 51 and the nonmagnetic plate 52 illustrated in FIG. 32 as a modification of the seventh embodiment may be arranged around each of the first magnet sheets 7 of the multi-layered rotor 45 presented in FIG. 27 as depicted in FIG. 35.

Moreover, a first annular coupling plate 21 may be provided instead of the annular auxiliary magnet 51 and the nonmagnetic plate 52.

(Eighth Embodiment)

An eighth embodiment of the present invention will now be described hereunder with reference to FIGS. 36 to 38.

A rotor 4 of the eighth embodiment is characterized in a first core sheet 5, a second core sheet 6 and a first magnet sheet 7 of the rotor 4 of the second embodiment. For purposes of illustration, the following discussion describes only this characteristic feature of the embodiment in detail without providing a detailed description of other features that are common with the foregoing embodiments.

Figure 36:
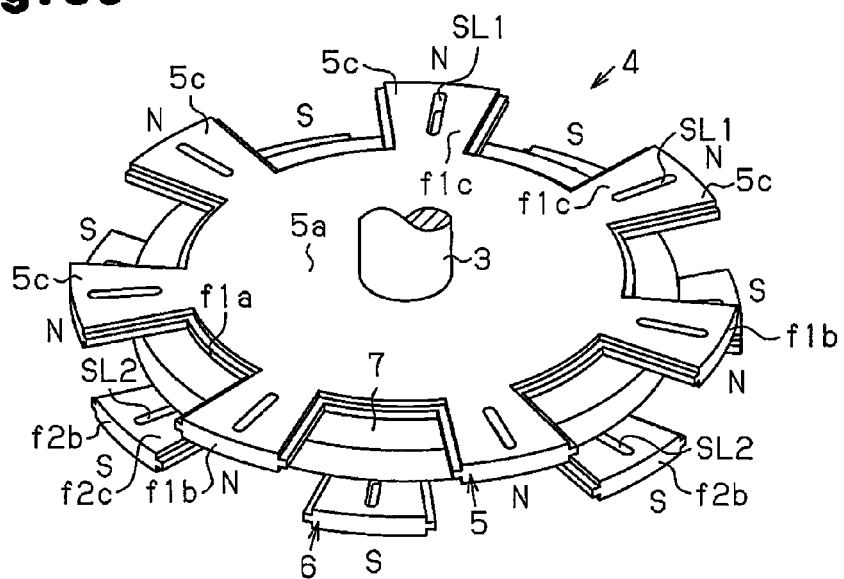
FIG. 36 is a perspective view of a rotor provided in a brushless motor according to an eighth embodiment of the present invention.
Figure 38:
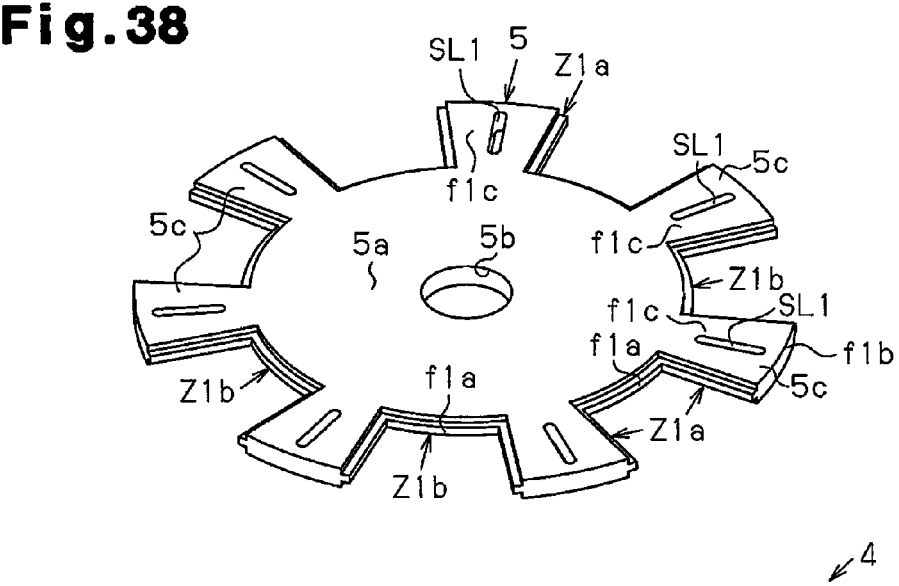
FIG. 38 is an exploded perspective view of the rotor of FIG. 36.
Figure 38:
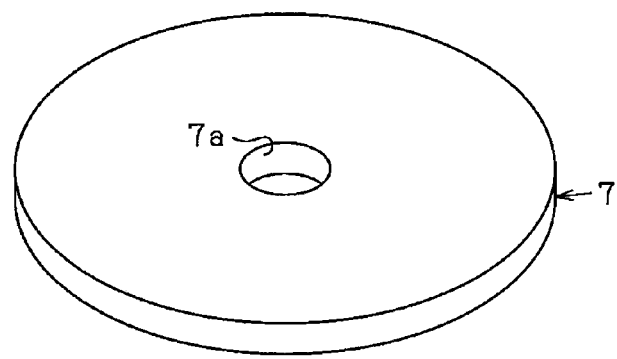
Figure 38:
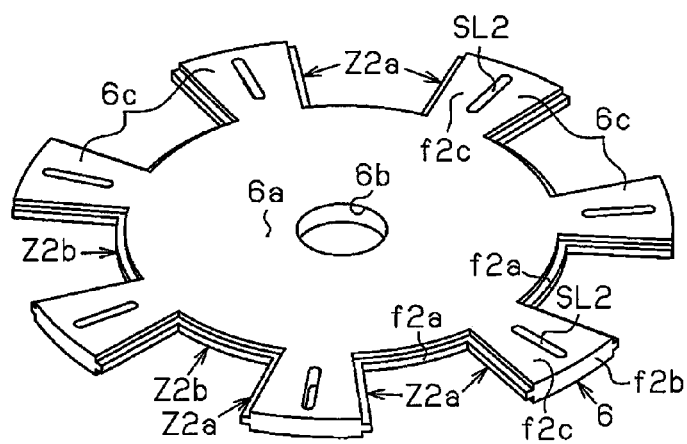

As illustrated in FIGS. 36 and 38, the rotor 4 of the eighth embodiment includes the first core sheet 5, the second core sheet 6 placed facing the first core sheet 5 and the first magnet sheet 7 placed between the first core sheet 5 and the second core sheet 6 as in the second embodiment.

As described in the second embodiment, the first core sheet 5 includes a first disk portion 5a and seven first supporting tabs 5c extending radially outward at equal circumferential intervals from an outer peripheral surface f1a of the first disk portion 5a as depicted in FIGS. 36 and 38. Outer peripheral surfaces f1b of the individual first supporting tabs 5c are positioned face to face with a curved inside surface Sa of a stator S (refer to FIG. 37) in radial directions, the outer peripheral surfaces f1b constituting arcuate curved surfaces arranged circumferentially along a circle around a central axis of a rotary shaft 3. The outer peripheral surfaces f1b are arranged concentrically with arcuate curved surfaces formed by teeth of the stator S, which are also centered around the central axis of the rotary shaft 3. Therefore, the distance between the outer peripheral surface f1b of each first supporting tab 5c and the curved inside surface Sa of the stator S, or an air gap EG therebetween, remains uniform all over the outer peripheral surface f1b.

Figure 37:
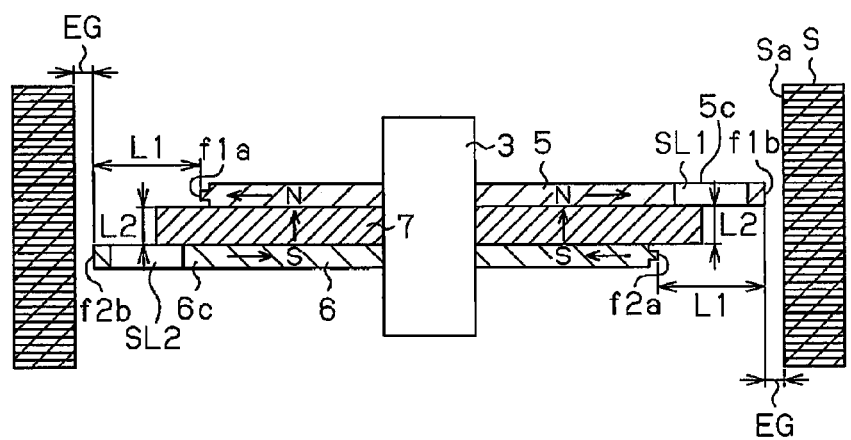
FIG. 37 is a cross-sectional view of the rotor of FIG. 36.

In this eighth embodiment, the individual first supporting tabs 5c are shaped such that the aforementioned air gap EG is smaller than the thickness L2 (length in the axial direction) of the first magnet sheet 7 as depicted in FIG. 37.

As illustrated in FIGS. 37 and 38, radially extending slits SL1 for rectifying magnetic flux are formed in the individual first supporting tabs 5c passing through radially elongated surfaces f1c thereof. These slits SL1 are formed at the same time as when the first core sheet 5 is formed by punching an electromagnetic steel plate made of a soft magnetic material.

As illustrated in FIG. 38, both circumferential side surfaces Z1a of each of the first supporting tabs 5c and outer peripheral parts Z1b of the first disk portion 5a are compressed from both axial sides by a press, for example, so that these portions Z1a, Z1b are formed to have a small thickness.

The second core sheet 6 has the same shape as the first core sheet 5 as depicted in FIG. 38. The second core sheet 6 includes a second disk portion 6a and seven second supporting tabs 6c extending radially outward at equal circumferential intervals from an outer peripheral surface f2a of the second disk portion 6a.

Thus, the distance between outer peripheral surface f2b of each of the second supporting tabs 6c and the curved inside surface Sa of the stator S (refer to FIG. 37), or an air gap EG therebetween, is made smaller than the thickness (length in the axial direction) of the first magnet sheet 7.

As depicted in FIGS. 37 and 38, radially extending slits SL2 for rectifying magnetic flux are formed in the individual second supporting tabs 6c passing through radially elongated surfaces f2c thereof. These slits SL2 are formed at the same time as when the second core sheet 6 is formed by punching an electromagnetic steel plate made of a soft magnetic material.

As illustrated in FIG. 38, both circumferential side surfaces Z2a of each of the second supporting tabs 6c and outer peripheral parts Z2b of the second disk portion 6a are compressed from both axial sides by a press, for example, so that these portions Z2a, Z2b are formed to have a small thickness.

The first magnet sheet 7 sandwiched and fixed between the first core sheet 5 and the second core sheet 6 is formed into a circular disk shape as in the second embodiment. Referring to FIG. 37, the first magnet sheet 7 is structured to have an outside diameter larger than the outside diameter of an imaginary cylinder formed by the outer peripheral surfaces f1a, f2a of the first and second disk portions 5a, 6a, that is, the outside diameter of the first and second core sheets 5, 6 excluding portions where the first and second supporting tabs 5c, 6c are formed, but smaller than the outside diameter of an imaginary cylinder formed by the outer peripheral surfaces f1b, f2b of the first and second supporting tabs 5c, 6c, that is, the outside diameter of the first and second core sheets 5, 6 including the portions where the first and second supporting tabs 5c, 6c are formed, respectively.

As in the second embodiment, the first magnet sheet 7 is magnetized such that a portion of the first magnet sheet 7 close to the first core sheet 5 constitutes a north pole and a portion of the first magnet sheet 7 close to the second core sheet 6 constitutes a south pole. Thus, the first magnet sheet 7 causes the individual first supporting tabs 5c of the first core sheet 5 to function as north poles (first magnetic poles) and the individual second supporting tabs 6c of the second core sheet 6 to function as south poles (second magnetic poles).

Operation of the eighth embodiment will now be described.

The first magnet sheet 7 is magnetized in the axial direction such that the portion of the first magnet sheet 7 close to the first core sheet 5 constitutes the north pole and the portion of the first magnet sheet 7 close to the second core sheet 6 constitutes the south pole.

The air gap EG between the outer peripheral surfaces f1b, f2b of the first and second supporting tabs 5c, 6c and the curved inside surface Sa of the stator S is smaller than the thickness L2 (length in the axial direction) of the first magnet sheet 7, so that it is possible to prevent the occurrence of leakage flux at the distal ends of the first and second supporting tabs 5c, 6c.

The outside diameter of the first magnet sheet 7 is larger than the outside diameter of the imaginary cylinder formed by the outer peripheral surfaces f1a, f2a of the first and second disk portions 5a, 6a but smaller than the outside diameter of the imaginary cylinder formed by the outer peripheral surfaces f1b, f2b of the first and second supporting tabs 5c, 6c, respectively. This arrangement serves to prevent the occurrence of leakage flux from the outer peripheral surface f1a of the first disk portion 5a toward the second supporting tabs 6c and from the outer peripheral surface f2a of the second disk portion 6a toward the first supporting tabs 5c.

Furthermore, as the slits SL1, SL2 are formed in the first and second supporting tabs 5c, 6c, respectively, it is possible to prevent an uneven distribution of lines of magnetic flux that may occur when the rotor 4 rotates relative to the stator S as well as the occurrence of magnetic saturation and reversed torque.

Additionally, the circumferential side surfaces Z1a, Z2a of each of the first and second supporting tabs 5c, 6c and the outer peripheral parts Z1b, Z2b of the first and second disk portions 5a, 6a are compressed to become thinner. This makes it possible to increase reluctance of each of the circumferential side surfaces Z1a, Z2a and the outer peripheral parts Z1b, Z2b and guide magnetic fluxes in directions facing the stator S.

The eighth embodiment discussed above achieves the below-described advantages in addition to the advantages of the second embodiment.

Since the air gap EG between the first and second supporting tabs 5c, 6c and the stator S is made smaller than the thickness L2 of the first magnet sheet 7, it is possible to prevent the occurrence of leakage flux at the distal ends of the first and second supporting tabs 5c, 6c and thereby increase the output of the brushless motor 1.

The outside diameter of the first magnet sheet 7 is made larger than the outside diameter of the imaginary cylinder formed by the first and second disk portions 5a, 6a but smaller than the outside diameter of the imaginary cylinder formed by the first and second supporting tabs 5c, 6c. As a consequence, it is possible to prevent the occurrence of leakage flux from the outer peripheral surface f1a of the first disk portion 5a toward the second supporting tabs 6c and from the outer peripheral surface f2a of the second disk portion 6a toward the first supporting tabs 5c and thereby increase the output of the motor 1.

The slits SL1, SL2 formed in the first and second supporting tabs 5c, 6c, respectively, serve to prevent an uneven distribution of lines of magnetic flux that may occur when the rotor 4 rotates relative to the stator S as well as the occurrence of magnetic saturation and reversed torque. This also makes it possible to increase the output of the motor 1.

Both of the circumferential side surfaces Z1a, Z2a of each of the first and second supporting tabs 5c, 6c and the outer peripheral parts Z1b, Z2b of the first and second disk portions 5a, 6a are compressed to become thinner. This makes it possible to increase reluctance of each of the circumferential side surfaces Z1a, Z2a and the outer peripheral parts Z1b, Z2b and guide magnetic fluxes in directions facing the stator S. Again, this serves to increase the output of the brushless motor 1.

Although the air gap EG is made smaller than the thickness L2 of the first magnet sheet 7 in the eighth embodiment, this feature of the embodiment may be omitted.

Conversely, this feature of the present embodiment to make the air gap EG smaller than the thickness L2 of the first magnet sheet 7 may be additionally implemented in the second embodiment.

In the eighth embodiment, the outside diameter of the first magnet sheet 7 is made larger than that of the imaginary cylinder formed by the first and second disk portions 5a, 6a but smaller than that of the imaginary cylinder formed by the first and second supporting tabs 5c, 6c. The rotor 4 of the eighth embodiment may be modified to employ, instead of the aforementioned arrangement, an arrangement in which the outside diameter of the first magnet sheet 7 equals the outside diameter of the first and second disk portions 5a, 6a as discussed in the second embodiment.

Conversely, the second embodiment may be modified to employ only the aforementioned arrangement of the eighth embodiment in which the outside diameter of the first magnet sheet 7 is larger than that of the imaginary cylinder formed by the first and second disk portions 5a, 6a but smaller than that of the imaginary cylinder formed by the first and second supporting tabs 5c, 6c. It is needless to say in this case that the feature of the eighth embodiment that the air gap EG is made smaller than the thickness L2 of the first magnet sheet 7 may be further implemented in the second embodiment in combination with the aforementioned arrangement.

Although the slits SL1, SL2 are formed in the first and second supporting tabs 5c, 6c, respectively, in the eighth embodiment, these SL1, SL2 may be omitted.

Conversely, only this feature of the eighth embodiment to form the slits SL1, SL2 in the first and second supporting tabs 5c, 6c, respectively, may be additionally implemented in the second embodiment. It is needless to say in this case that one or both of the arrangement to make the air gap EG smaller than the thickness L2 of the first magnet sheet 7 and the arrangement to make the outside diameter of the first magnet sheet 7 larger than that of the imaginary cylinder formed by the first and second disk portions 5a, 6a but smaller than that of the imaginary cylinder formed by the first and second supporting tabs 5c, 6c may be further implemented in the second embodiment in combination with the slits SL1, SL2.

Although the circumferential side surfaces Z1a, Z2a of each of the first and second supporting tabs 5c, 6c and the outer peripheral parts Z1b, Z2b of the first and second disk portions 5a, 6a are compressed to become thinner in the eighth embodiment, the eighth embodiment may be implemented without thinning these portions by crushing.

Conversely, only this feature of the eighth embodiment to make the circumferential side surfaces Z1a, Z2a and the outer peripheral parts Z1b, Z2b thinner by crushing may be additionally implemented in the second embodiment. It is needless to say in this case that one or more of the arrangement to make the air gap EG smaller than the thickness L2 of the first magnet sheet 7, the arrangement to make the outside diameter of the first magnet sheet 7 larger than that of the imaginary cylinder formed by the first and second disk portions 5a, 6a but smaller than that of the imaginary cylinder formed by the first and second supporting tabs 5c, 6c and the arrangement to form the slits SL1, SL2 in the first and second supporting tabs 5c, 6c, respectively, may be further implemented in the second embodiment in combination with the aforementioned feature of the eighth embodiment.

Although the circumferential side surfaces Z1a, Z2a of each of the first and second supporting tabs 5c, 6c and the outer peripheral parts. Z1b, Z2b of the first and second disk portions 5a, 6a are compressed to become thinner in the eighth embodiment, only the circumferential side surfaces Z1a, Z2a or the outer peripheral parts Z1b, Z2b may be thinned by crushing. Also, although the circumferential side surfaces Z1a, Z2a of each of the first and second supporting tabs 5c, 6c and the outer peripheral parts Z1b, Z2b of the first and second disk portions 5a, 6a are compressed from both axial sides in the eighth embodiment, these portions may be compressed from one axial side only.

The eighth embodiment may also be applied to the rotor 8 of the third embodiment including a pair of magnet sheets, that is, the first and second magnet sheets 7, 10, or to the rotor 11 depicted in FIG. 15 having the multi-layered structure including an increased number of core sheets.

Furthermore, the eighth embodiment may be applied to the rotor 20 of the fourth embodiment in which the first annular coupling plate 21 is placed between the first core sheet 5 and the second core sheet 6. Needless to say, the eighth embodiment may be applied to the rotor 11 provided with the second to fifth annular coupling plates 22, 23, 24, 25 depicted in FIG. 19.

In the eighth embodiment, the arcuate curved surfaces formed by the outer peripheral surfaces f1a, f2a of the first and second supporting tabs 5c, 6c are arranged concentrically with the arcuate curved surfaces formed by the teeth of the stator S, forming a circle centered around the central axis of the rotary shaft 3. The eighth embodiment may be modified to employ, instead of the aforementioned arrangement, an arrangement in which each of the outer peripheral surfaces f1a, f2a forms a surface that becomes progressively more separated from the curved inside surface Sa of the stator S from the middle of the surface circumferentially toward both circumferential ends of the surface. This means that the outer peripheral surfaces f1a, f2a may be curved surfaces having a curvature different from that of the curved inside surface Sa of the stator S.

In this case, the distance between the outer peripheral surfaces f1a, f2a of the first and second supporting tabs 5c, 6c and the stator S at each point where this distance is maximized, or a maximum value of the air gap EG, is made smaller than the thickness L2 of the first magnet sheet 7.

(Ninth Embodiment)

A ninth embodiment of the present invention will now be described hereunder with reference to FIGS. 39 to 41.

A rotor 30 of the ninth embodiment is characterized in a first core sheet 5, a second core sheet 6 and a first magnet sheet 7 of the rotor 30 of the fifth embodiment. For purposes of illustration, the following discussion describes only this characteristic feature of the embodiment in detail without providing a detailed description of other features that are common with the foregoing embodiments.

Figure 39:
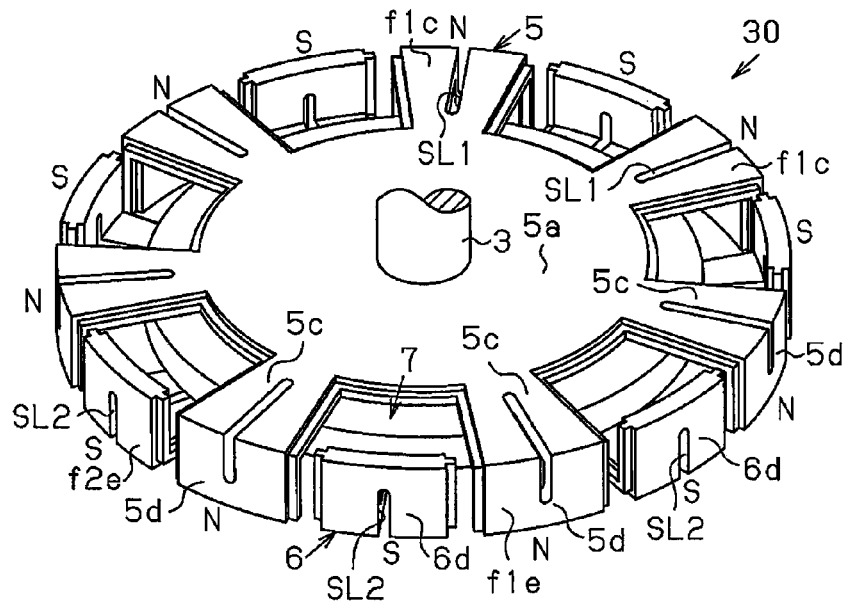
FIG. 39 is a perspective view of a rotor provided in a brushless motor according to a ninth embodiment of the present invention.
Figure 41:
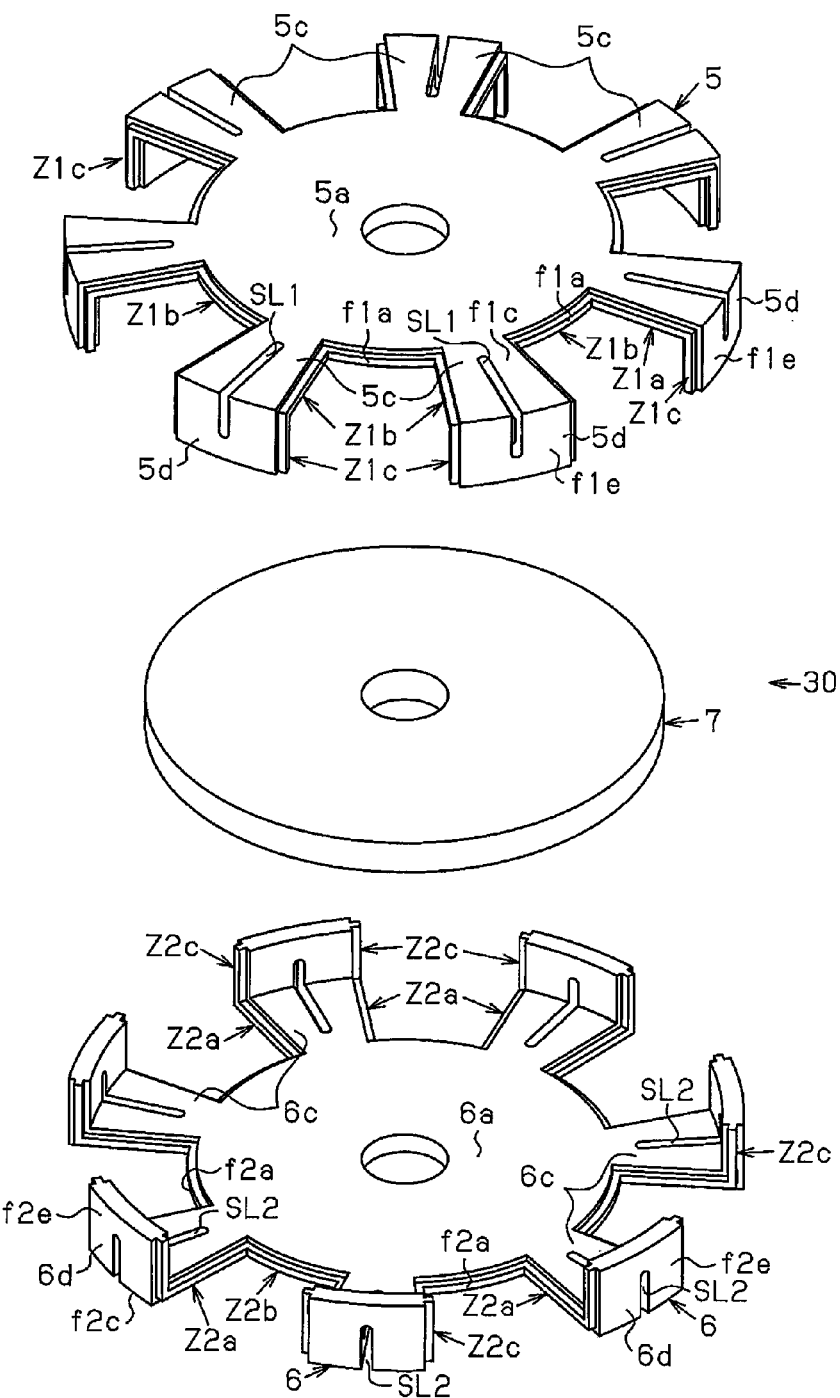
FIG. 41 is an exploded perspective view of the rotor of FIG. 39.

As illustrated in FIGS. 39 and 41, the rotor 30 of the ninth embodiment includes the first core sheet 5, the second core sheet 6 and the first magnet sheet 7 sandwiched between the first core sheet 5 and the second core sheet 6 as in the second embodiment.

As described in the fifth embodiment, the first core sheet 5 includes a first disk portion 5a, seven first supporting tabs 5c each extending radially outward by a distance L1 from an outer peripheral surface of the first disk portion 5a, and first claw poles 5d extending from arc-shaped distal ends of the individual first supporting tabs 5c toward the second core sheet 6.

Radially outer peripheral surfaces f1e of the individual first claw poles 5d are positioned face to face with a curved inside surface Sa of a stator S. The outer peripheral surfaces f1e of the individual first claw poles 5d constitute arcuate curved surfaces arranged circumferentially along a circle around a central axis of a rotary shaft 3. The outer peripheral surfaces f1e are arranged concentrically with arcuate curved surfaces formed along the curved inside surface Sa of the stator S, which is also centered around the central axis of the rotary shaft 3 (refer to FIG. 40). Therefore, the distance between the outer peripheral surface f1e of each first claw pole 5d and the curved inside surface Sa of the stator S, or an air gap EG therebetween, remains uniform all over the outer peripheral surface fie.

Figure 40:
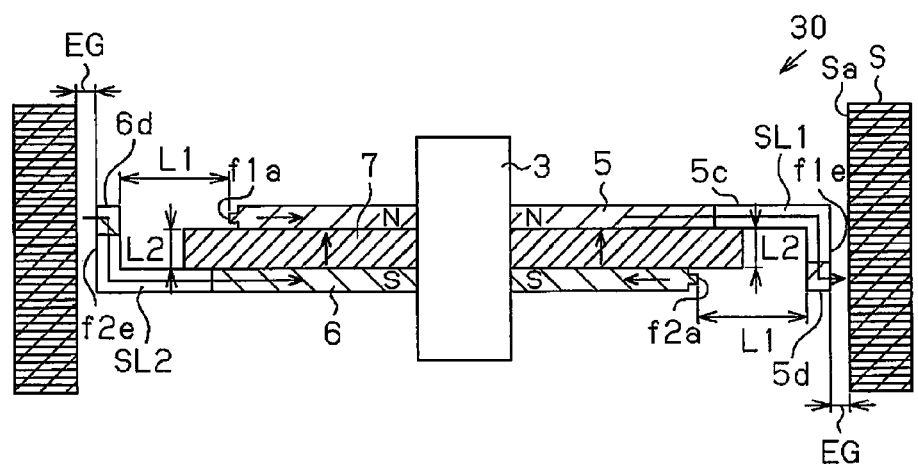
FIG. 40 is a cross-sectional view of the rotor of FIG. 39 as viewed in the axial direction.

In the ninth embodiment, the individual first supporting tabs 5c are shaped such that the aforementioned air gap EG is smaller than the thickness L2 (length in the axial direction) of the first magnet sheet 7 as depicted in FIG. 40.

As described in the fifth embodiment, each of axial ends of the first claw poles 5d extends in the axial direction up to a position where a surface of the second core sheet 6 on a side thereof opposite to the first core sheet 5 is located.

As depicted in FIGS. 40 and 41, radially extending slits SL1 for rectifying magnetic flux are formed in the individual first supporting tabs 5c passing through radially elongated surfaces f1c thereof. These slits SL1 extend up to the outer peripheral surfaces f1e of the individual first claw poles 5d extending in the axial direction. The slits SL1 are formed at the same time as when the first core sheet 5 is formed by punching an electromagnetic steel plate made of a soft magnetic material.

As illustrated in FIG. 41, both circumferential side surfaces Z1a of each of the first supporting tabs 5c and outer peripheral parts Z1b of the first disk portion 5a are compressed from both axial sides by a press, for example, so that these portions Z1a, Z1b are formed to have a small thickness. Similarly, both circumferential side surfaces Z1c of each of the first claw poles 5d are compressed from both radial sides by a press, for example, so that the side surfaces Z1c have a small thickness.

The second core sheet 6, which is formed into the same shape as the first core sheet 5, includes a second disk portion 6a, seven second supporting tabs 6c each extending radially outward by a distance L1 from an outer peripheral surface of the second disk portion 6a, and second claw poles 6d extending from arc-shaped distal ends of the individual second supporting tabs 6c toward the first core sheet 5 as depicted in FIGS. 39 and 41. The individual second supporting tabs 6c are shaped such that the distance between an outer peripheral surface f2e of each second claw pole 6d and the curved inside surface Sa of the stator S (refer to FIG. 40), or an air gap EG therebetween, is smaller than the thickness L2 of the first magnet sheet 7.

Each of axial ends of the second claw poles 6d extends in the axial direction up to a position where a surface of the first core sheet 5 on a side thereof opposite to the second core sheet 6 is located.

As depicted in FIGS. 40 and 41, radially extending slits SL2 for rectifying magnetic flux are formed in the individual second supporting tabs 6c passing through radially elongated surfaces f2c thereof. These slits SL2 extend up to the outer peripheral surfaces f2e of the individual second claw poles 6d extending in the axial direction. The slits SL2 are formed at the same time as when the second core sheet 6 is formed by punching an electromagnetic steel plate made of a soft magnetic material in the same way as described in the fifth embodiment.

As illustrated in FIG. 41, both circumferential side surfaces Z2a of each of the second supporting tabs 6c and outer peripheral parts Z2b of the second disk portion 6a are compressed from both axial sides by a press, for example, so that these portions Z2a, Z2b are formed to have a small thickness. Similarly, both circumferential side surfaces Z2c of each of the second claw poles 6d are compressed from both radial sides by a press, for example, so that the side surfaces Z2c have a small thickness.

The first magnet sheet 7 sandwiched and fixed between the first core sheet 5 and the second core sheet 6 is formed into a circular disk shape as in the fifth embodiment. Referring to FIG. 40, the first magnet sheet 7 is structured to have an outside diameter larger than the outside diameter of the outer peripheral surfaces f1a, f2a of the first and second disk portions 5a, 6a but smaller than the inside diameter of an imaginary cylinder formed by the first and second claw poles 5d, 6d.

As in the fifth embodiment, the first magnet sheet 7 is magnetized such that a portion of the first magnet sheet 7 close to the first core sheet 5 constitutes a north pole and a portion of the first magnet sheet 7 close to the second core sheet 6 constitutes a south pole. Thus, the first magnet sheet 7 causes the individual first claw poles 5d of the first core sheet 5 to function as north poles (first magnetic poles) and the individual second claw poles 6d of the second core sheet 6 to function as south poles (second magnetic poles).

Operational features of the ninth embodiment will now be described.

The first magnet sheet 7 is magnetized in the axial direction such that the first claw poles 5d act as the north poles and the second claw poles 6d act as the south poles.

The air gap EG between the outer peripheral surfaces f1e, f2e of the first and second claw poles 5d, 6d and the curved inside surface Sa of the stator S is smaller than the thickness L2 of the first magnet sheet 7, so that it is possible to prevent the occurrence of leakage flux at distal ends of the first and second claw poles 5d, 6d.

The outside diameter of the first magnet sheet 7 is larger than the outside diameter of the outer peripheral surfaces f1a, f2a of the first and second disk portions 5a, 6a but smaller than the inside diameter of the imaginary cylinder formed by the first and second claw poles 5d, 6d. This arrangement serves to prevent the occurrence of leakage flux from the outer peripheral surface f1a of the first disk portion 5a toward the second supporting tabs 6c and from the outer peripheral surface f2a of the second disk portion 6a toward the first supporting tabs 5c.

Furthermore, as the slits SL1, SL2 are formed in the first supporting tabs 5c and the first claw poles 5d as well as in the second supporting tabs 6c and the second claw poles 6d, respectively, it is possible to prevent an uneven distribution of lines of magnetic flux that may occur when the rotor 30 rotates relative to the stator S as well as the occurrence of magnetic saturation and reversed torque.

Additionally, the circumferential side surfaces Z1a, Z2a of each of the first and second supporting tabs 5c, 6c and the outer peripheral parts Z1b, Z2b of the first and second disk portions 5a, 6a, as well as the circumferential side surfaces Z1c, Z2c of the first and second claw poles 5d, 6d, are compressed to become thinner. This makes it possible to increase reluctance of each of the circumferential side surfaces Z1a, Z2a, Z1c, Z2c and the outer peripheral parts Z1b, Z2b and guide magnetic fluxes in directions facing the stator S.

The ninth embodiment discussed above achieves the below-described advantages in addition to the advantages of the fifth embodiment.

Since the air gap EG between the first and second claw poles 5d, 6d and the stator S is made smaller than the thickness L2 of the first magnet sheet 7, it is possible to prevent the occurrence of leakage flux at the distal ends of the first and second claw poles 5d, 6d and thereby increase the output of the motor 1.

The outside diameter of the first magnet sheet 7 is made larger than the outside diameter of the first and second disk portions 5a, 6a but smaller than the inside diameter of the imaginary cylinder formed by the first and second claw poles 5d, 6d. As a result, it is possible to prevent the occurrence of leakage flux from the outer peripheral surface f1a of the first disk portion 5a toward the second supporting tabs 6c and from the outer peripheral surface f2a of the second disk portion 6a toward the first supporting tabs 5c and thereby increase the output of the motor 1.

The slits SL1, SL2 formed to extend into the first and second claw poles 5d, 6d, respectively, serve to prevent an uneven distribution of lines of magnetic flux that may occur when the rotor 30 rotates relative to the stator S as well as the occurrence of magnetic saturation and reversed torque. This also makes it possible to increase the output of the motor 1.

Both of the circumferential side surfaces Z1c, Z2c of each of the first and second claw poles 5d, 6d are compressed to become thinner. This makes it possible to increase reluctance of each of the circumferential side surfaces Z1c, Z2c and guide magnetic fluxes in directions facing the stator S. Again, this serves to increase the output of the motor 1.

Although the air gap EG is made smaller than the thickness L2 of the first magnet sheet 7 in the ninth embodiment, this feature of the embodiment may be omitted.

Conversely, this feature of the present embodiment to make the air gap EG smaller than the thickness L2 of the first magnet sheet 7 may be additionally implemented in the fifth embodiment.

In the ninth embodiment, the outside diameter of the first magnet sheet 7 is made larger than that of the first and second disk portions 5a, 6a but smaller than the inside diameter of the imaginary cylinder formed by the first and second claw poles 5d, 6d. The rotor 30 of the ninth embodiment may be modified to employ, instead of the aforementioned arrangement, an arrangement in which the outside diameter of the first magnet sheet 7 equals the outside diameter of the first and second disk portions 5a, 6a as discussed in the fifth embodiment.

Conversely, the fifth embodiment may be modified to employ only the aforementioned arrangement of the ninth embodiment in which the outside diameter of the first magnet sheet 7 is larger than that of the first and second disk portions 5a, 6a but smaller than the inside diameter of the imaginary cylinder formed by the first and second claw poles 5d, 6d. It is needless to say in this case that the feature of the ninth embodiment that the air gap EG is made smaller than the thickness L2 of the first magnet sheet 7 may be further implemented in the fifth embodiment in combination with the aforementioned arrangement.

Although the slits SL1, SL2 are formed in the first supporting tabs 5c and the first claw poles 5d as well as in the second supporting tabs 6c and the second claw poles 6d, respectively, in the ninth embodiment, these SL1, SL2 may be omitted.

Conversely, only this feature of the ninth embodiment to form the slits SL1, SL2 in the first supporting tabs 5c and the first claw poles 5d as well as in the second supporting tabs 6c and the second claw poles 6d, respectively, may be additionally implemented in the fifth embodiment. It is needless to say in this case that one or both of the arrangement to make the air gap EG smaller than the thickness L2 of the first magnet sheet 7 and the arrangement to make the outside diameter of the first magnet sheet 7 larger than that of the first and second disk portions 5a, 6a but smaller than the inside diameter of the imaginary cylinder formed by the first and second claw poles 5d, 6d may be further implemented in the fifth embodiment in combination with the slits SL1, SL2.

Although the circumferential side surfaces Z1a, Z2a of each of the first and second supporting tabs 5c, 6c and the outer peripheral parts Z1b, Z2b of the first and second disk portions 5a, 6a, as well as the circumferential side surfaces Z1c, Z2c of the first and second claw poles 5d, 6d, are compressed to become thinner in the ninth embodiment, the ninth embodiment may be implemented without thinning these portions by crushing.

Conversely, only this feature of the ninth embodiment to make the circumferential side surfaces Z1a, Z2a, Z1c, Z2c and the outer peripheral parts Z1b, Z2b thinner by crushing may be additionally implemented in the fifth embodiment. It is needless to say in this case that one or more of the arrangement to make the air gap EG smaller than the thickness L2 of the first magnet sheet 7, the arrangement to make the outside diameter of the first magnet sheet 7 larger than that of the first and second disk portions 5a, 6a but smaller than the inside diameter of the imaginary cylinder formed by the first and second claw poles 5d, 6d and the arrangement to form the slits SL1, SL2 in the first supporting tabs 5c and the first claw poles 5d as well as in the second supporting tabs 6c and the second claw poles 6d, respectively, may be further implemented in the fifth embodiment in combination with the aforementioned feature of the ninth embodiment.

The ninth embodiment may be implemented in such a modification that the thickness of at least one group of the circumferential side surfaces Z1a, Z2a, Z1c, Z2c and the outer peripheral parts Z1b, Z2b are not thinned.

Furthermore, the ninth embodiment may be applied to the rotor 30 depicted in FIG. 23, the rotor 40 discussed in the sixth embodiment, the rotor 45 depicted in FIG. 27, 33 or 34, or the rotor 50 discussed in the seventh embodiment.

In the ninth embodiment, an imaginary cylinder formed by the outer peripheral surfaces f1e, f2e of the first and second claw poles 5d, 6d and the curved inside surface of the stator S are arranged concentrically with a circle centered around the central axis of the rotary shaft 3. The ninth embodiment may be modified to employ, instead of the aforementioned arrangement, an arrangement in which each of the outer peripheral surfaces f1e, f2e forms a surface which becomes progressively more separated from the curved inside surface Sa (teeth) of the stator S from the middle of the surface circumferentially toward both circumferential ends of the surface. This means that the outer peripheral surfaces f1e, f2e may be curved surfaces having a curvature different from that of the curved inside surface of the stator S.

In this case, the distance between the outer peripheral surfaces f1e, f2e of the first and second claw poles 5d, 6d and the stator S at each point where this distance is maximized, or a maximum value of the air gap EG, is made smaller than the thickness L2 of the first magnet sheet 7.

The second to ninth embodiments may be modified as described below.

Although seven first supporting tabs 5c and seven second supporting tabs 6c are formed in the second to ninth embodiments, the invention is not limited thereto and the number of the first and second supporting tabs 5c, 6c may be altered as appropriate.

Also, although the individual core sheets are formed from electromagnetic steel plates in the second to ninth embodiments, cold-rolled steel plates (SPCC) may be used instead of the electromagnetic steel plates.

The number of rotors stacked in each of the multi-layered (tandem) rotors 11, 45 illustrated in FIGS. 15, 19, 27, 32, and 33 may be altered as appropriate.

The invention claimed is:

1. A rotor having a circumferential direction, radial directions, and an axial direction, the rotor comprising:
 a first rotor core including a first main body portion and a plurality of first extensions, which extend radially outward from the first main body portion at equal intervals in the circumferential direction;
 a second rotor core including a second main body portion and a plurality of second extensions, which extend radially outward from the second main body portion at equal intervals in the circumferential direction; and
 a field magnet, which is placed between the first rotor core and the second rotor core in the axial direction and is magnetized in the axial direction to cause the first extensions to function as first magnetic poles and the second extensions to function as second magnetic poles, wherein
 a magnetic pole constituting section including at least part of each of the first extensions and the first main body portion are manufactured with different materials, manufactured with the same material but formed as separate elements, or include regions having different properties, and
 a magnetic pole constituting section including at least part of each of the second extensions and the second main body portion are manufactured with different materials, manufactured with the same material but formed as separate elements, or include regions having different properties.

2. The rotor according to claim 1, wherein the first and second rotor cores are formed by a punching operation, and the regions having the different properties are cut surfaces of the first and second rotor cores formed by the punching operation.

3. The rotor according to claim 1, wherein
 the first main body portion constitutes a substantially disk-like first core base,
 the first extensions constitute first claw poles, which extend radially outward from an outer periphery of the first core base and then extend in the axial direction,
 the second main body portion constitutes a substantially disk-like second core base,
 the second extensions constitute second claw poles, which extend radially outward from an outer periphery of the second core base and then extend in the axial direction, and
 each of the second claw poles is positioned between two adjacent ones of the first claw poles.

4. The rotor according to claim 3, wherein each magnetic pole constituting section includes at least a portion of an outer peripheral surface of a claw pole.

5. The rotor according to claim 4, wherein the magnetic pole constituting sections are formed from a powder magnetic core material.

6. The rotor according to claim 4, wherein the magnetic pole constituting sections are formed of a plurality of laminated steel plates.

7. The rotor according to claim 6, wherein the steel plates are laminated in the circumferential direction.

8. The rotor according to claim 6, wherein the steel plates are laminated in the axial direction.

9. The rotor according to claim 3, wherein each magnetic pole constituting section and corresponding one of the main body portions of the first and second rotor cores are formed as separate elements and fitted together.

10. The rotor according to claim 2, wherein each of the first and second rotor cores is formed into a sheet-like shape by punching a sheet of a soft magnetic material.

11. The rotor according to claim 10, wherein first and second extensions that are located adjacent to each other in the circumferential direction are circumferentially separated from each other all the way from a proximal end to a distal end of the extension as viewed in the axial direction.

12. The rotor according to claim 11, wherein the distance between first and second extensions that are located circumferentially adjacent to each other is equal to or larger than the thickness of each of the rotor cores measured in the axial direction.

13. The rotor according to claim 10, wherein
 the field magnet has an outer peripheral surface, and
 the distance measured radially from this outer peripheral surface to a distal end of each of the first and second extensions is larger than the thickness of the field magnet measured in the axial direction.

14. The rotor according to claim 10, wherein
 the rotor is configured to be located on the radially inner side of a stator, and
 an air gap formed between outer peripheral surfaces of distal ends of the first and second extensions and the stator is smaller than the thickness of the field magnet measured in the axial direction.

15. The rotor according to claim 14, wherein
the outer peripheral surfaces of the distal ends of the first and second extensions form curved surfaces concentric with a curved inside surface of the stator or form curved surfaces having a curvature different from that of the curved inside surface of the stator, and
a maximum value of the air gap is smaller than the thickness of the field magnet measured in the axial direction.

16. The rotor according to claim 10, wherein the field magnet has an outside diameter of which the value is between that of the outside diameter of an outer peripheral surface of each of the first and second main body portions and that of the outside diameter of the first and second extensions.

17. The rotor according to claim 10, wherein radially extending slits for rectifying magnetic flux are formed individually in radially elongated surfaces of the first and second extensions.

18. The rotor according to claim 14, wherein at least one group of outer peripheral parts of the first and second main body portions and circumferential side surfaces of the first and second extensions is compressed to become thinner.

19. The rotor according to claim 10, wherein
the first main body portion constitutes a substantially disk-like first core base,
the first extensions constitute first claw poles, which extend radially outward from an outer periphery of the first core base and then extend toward the second rotor core in the axial direction,
the second main body portion constitutes a substantially disk-like second core base,
the second extensions constitute second claw poles, which extend radially outward from an outer periphery of the second core base and then extend toward the first rotor core in the axial direction,
each of the second claw poles is positioned between two circumferentially adjacent ones of the first claw poles, and
an outer peripheral surface of the field magnet is separated radially away from curved inside surfaces of the first and second claw poles.

20. The rotor according to claim 19, wherein
the rotor is configured to be located on the radially inner side of a stator, and
an air gap formed between outer peripheral surfaces of the first and second claw poles and the stator is smaller than the thickness of the field magnet measured in the axial direction.

21. The rotor according to claim 19, wherein
the rotor is configured to be located on the radially inner side of a stator,
outer peripheral surfaces of distal ends of the first and second claw poles form curved surfaces concentric with a curved inside surface of the stator or form curved surfaces having a curvature different from that of the curved inside surface of the stator, and
a maximum value of the air gap is smaller than the thickness of the field magnet measured in the axial direction.

22. The rotor according to claim 19, wherein
radially extending slits for rectifying magnetic flux are formed individually in radially elongated surfaces of the first and second claw poles, and
the slits further extend in the axial direction on planes that are elongated in the axial direction of the first and second claw poles.

23. The rotor according to claim 19, wherein circumferential side surfaces of the first and second claw poles are compressed to become thinner.

24. The rotor according to claim 10, wherein at least one of a coupling plate made of a nonmagnetic material and an auxiliary magnet is arranged to surround the field magnet.

25. The rotor according to claim 10, further comprising:
a third rotor core having the same shape as the first rotor core and including third extensions, which have the same configuration as the first extensions; and
a second field magnet, which is held between the third rotor core and the second rotor core,
wherein the second field magnet causing the third extensions to function as the first magnetic poles and the second extensions to function as the second magnetic poles.

26. A rotor set comprising a plurality of rotors each of which is identical to the rotor according to claim 10, wherein the rotors are stacked in the axial direction.

27. The rotor set according to claim 26, wherein a pair of rotors stacked face to face in the axial direction is arranged in such a fashion that north poles or south poles of the field magnets of the pair of rotors are oriented to face each other.

28. The rotor set according to claim 26, wherein the number of the rotors that are stacked is an even number.

29. A motor comprising the rotor according to claim 1.

* * * * *